(12) United States Patent
Knight et al.

(10) Patent No.: US 9,866,810 B2
(45) Date of Patent: Jan. 9, 2018

(54) OPTIMIZATION OF OPTICAL SYSTEMS FOR IMPROVED LIGHT FIELD CAPTURE AND MANIPULATION

(71) Applicant: Lytro, Inc., Mountain View, CA (US)

(72) Inventors: Timothy Knight, Sunnyvale, CA (US); Colvin Pitts, Snohomish, WA (US); Kurt Akeley, Saratoga, CA (US); Yuriy Romanenko, San Jose, CA (US); Carl (Warren) Craddock, San Francisco, CA (US)

(73) Assignee: Lytro, Inc., Mountain View, CA (US)

( * ) Notice: Subject to any disclaimer, the term of this patent is extended or adjusted under 35 U.S.C. 154(b) by 36 days.

(21) Appl. No.: 15/050,183

(22) Filed: Feb. 22, 2016

(65) Prior Publication Data

US 2016/0173844 A1 Jun. 16, 2016

Related U.S. Application Data

(62) Division of application No. 13/888,192, filed on May 6, 2013, now Pat. No. 9,300,932.

(Continued)

(51) Int. Cl.
*H04N 9/64* (2006.01)
*H04N 9/04* (2006.01)
(Continued)

(52) U.S. Cl.
CPC ......... *H04N 9/646* (2013.01); *G02B 27/0075* (2013.01); *H04N 5/2254* (2013.01);
(Continued)

(58) Field of Classification Search
CPC ..................................................... H04N 9/646
(Continued)

(56) References Cited

U.S. PATENT DOCUMENTS 4,383,170 A 5/1983 Takagi et al.
4,661,986 A 4/1987 Adelson
(Continued)

FOREIGN PATENT DOCUMENTS

JP 2010020100 1/2010
JP 2011135170 7/2011
(Continued)

OTHER PUBLICATIONS

Chen, S., et al. "A CMOS Image Sensor with On-Chip Image Compression Based on Predictive Boundary Adaptation and Memoryless QTD Algorithm", Very Large Scale Integration (VLSI) Systems, IEEE Transactions, vol. 19, Issue 4, Apr. 2011.
(Continued)

*Primary Examiner* — Joel Fosselman
(74) *Attorney, Agent, or Firm* — Raubvogel Law Office

(57) ABSTRACT

According to various embodiments of the present invention, the optical systems of light field capture devices are optimized so as to improve captured light field image data. Optimizing optical systems of light field capture devices can result in captured light field image data (both still and video) that is cheaper and/or easier to process. Optical systems can be optimized to yield improved quality or resolution when using cheaper processing approaches whose computational costs fit within various processing and/or resource constraints. As such, the optical systems of light field cameras can be optimized to reduce size and/or cost and/or increase the quality of such optical systems.

8 Claims, 31 Drawing Sheets

Related U.S. Application Data

(60) Provisional application No. 61/644,851, filed on May 9, 2012.

(51) Int. Cl.
*H04N 5/225* (2006.01)
*H04N 9/07* (2006.01)
*G02B 27/00* (2006.01)

(52) U.S. Cl.
CPC .............. *H04N 9/04* (2013.01); *H04N 9/045* (2013.01); *H04N 9/07* (2013.01)

(58) Field of Classification Search
USPC ........................................................ 348/340
See application file for complete search history.

(56) References Cited

U.S. PATENT DOCUMENTS

| | | |
|---|---|---|
| 4,920,419 A | 4/1990 | Easterly |
| 5,076,687 A | 12/1991 | Adelson |
| 5,748,371 A | 5/1998 | Cathey, Jr. et al. |
| 5,757,423 A | 5/1998 | Tanaka et al. |
| 5,949,433 A | 9/1999 | Klotz |
| 6,023,523 A | 2/2000 | Cohen et al. |
| 6,091,860 A | 7/2000 | Dimitri |
| 6,097,394 A | 8/2000 | Levoy et al. |
| 6,137,100 A | 10/2000 | Fossum et al. |
| 6,201,899 B1 | 3/2001 | Bergen |
| 6,320,979 B1 | 11/2001 | Melen |
| 6,466,207 B1 | 10/2002 | Gortler et al. |
| 6,483,535 B1 | 11/2002 | Tamburrino et al. |
| 6,842,297 B2 | 1/2005 | Dowski, Jr. et al. |
| 7,034,866 B1 | 4/2006 | Colmenarez et al. |
| 7,417,670 B1 | 8/2008 | Linzer et al. |
| 7,620,309 B2 | 11/2009 | Georgiev |
| 7,623,726 B1 | 11/2009 | Georgiev |
| 7,687,757 B1 | 3/2010 | Tseng et al. |
| 7,723,662 B2 | 5/2010 | Levoy et al. |
| 7,936,392 B2 | 5/2011 | Ng et al. |
| 7,949,252 B1 | 5/2011 | Georgiev |
| 8,085,391 B2 | 12/2011 | Machida et al. |
| 8,189,089 B1 | 5/2012 | Georgiev et al. |
| 8,279,325 B2 | 10/2012 | Pitts et al. |
| 8,289,440 B2 | 10/2012 | Knight et al. |
| 8,290,358 B1 | 10/2012 | Georgiev |
| 8,724,014 B2 | 5/2014 | Ng et al. |
| 8,768,102 B1 | 7/2014 | Ng et al. |
| 9,106,914 B2 | 8/2015 | Doser |
| 9,386,288 B2 * | 7/2016 | Akeley ............... H04N 9/045 |
| 2002/0109783 A1 | 8/2002 | Hayashi et al. |
| 2007/0230944 A1 | 10/2007 | Georgiev |
| 2007/0252074 A1 | 11/2007 | Ng et al. |
| 2008/0131019 A1 | 6/2008 | Ng |
| 2008/0144952 A1 | 6/2008 | Chen et al. |
| 2008/0260291 A1 | 10/2008 | Alakarhu et al. |
| 2008/0309813 A1 | 12/2008 | Watanabe |
| 2009/0027542 A1 | 1/2009 | Yamamoto et al. |
| 2009/0128669 A1 | 5/2009 | Ng et al. |
| 2009/0268970 A1 | 10/2009 | Babacan et al. |
| 2010/0026852 A1 | 2/2010 | Ng et al. |
| 2010/0128145 A1 | 5/2010 | Pitts et al. |
| 2010/0129048 A1 | 5/2010 | Pitts et al. |
| 2010/0142839 A1 | 6/2010 | Lakus-Becker |
| 2010/0277629 A1 | 11/2010 | Tanaka |
| 2010/0328485 A1 | 12/2010 | Imamura et al. |
| 2011/0025827 A1 | 2/2011 | Shpunt et al. |
| 2011/0129165 A1 | 6/2011 | Lim et al. |
| 2011/0205384 A1 | 8/2011 | Zarnowski et al. |
| 2011/0221947 A1 | 9/2011 | Awazu |
| 2012/0050562 A1 | 3/2012 | Perwass et al. |
| 2012/0327222 A1 | 12/2012 | Ng et al. |
| 2013/0070060 A1 | 3/2013 | Chatterjee et al. |
| 2013/0113981 A1 | 5/2013 | Knight et al. |

FOREIGN PATENT DOCUMENTS

| | | |
|---|---|---|
| WO | 03052465 | 6/2003 |
| WO | 2006039486 | 4/2006 |
| WO | 2007092545 | 8/2007 |
| WO | 2007092581 | 8/2007 |
| WO | 2011081187 | 7/2011 |

OTHER PUBLICATIONS

Chen, W., et al., "Light field mapping: Efficient representation and hardware rendering of surface light fields". ACM Transactions on Graphics 21, 3, 447-456, 2002.

Daly, D., "Microlens Array". Retrieved Jan. 2013.

Duparre, J., et al., "Micro-Optical Artificial Compound Eyes", Institute of Physics Publishing, Apr. 2006.

Super CCD EXR Sensor by Fujifilm, brochure reference No. EB-807E, 2008.

Georgiev, T., et al., Plenoptic Camera 2.0 (2008).

Georgiev, T., et al., "Unified Frequency Domain Analysis of Lighffield Cameras" (2008).

Georgiev, T., et al., "Spatio-Angular Resolution Tradeoff in Integral Photography," Proceedings of Eurographics Symposium on Rendering, 2006.

Haeberli, P., "A Multifocus Method for Controlling Depth of Field" GRAPHICA Obscura, 1994, pp. 1-3.

Isaksen, A., et al., "Dynamically Reparameterized Light Fields," SIGGRAPH 2000, pp. 297-306.

Levoy, M., et al., "Light Field Microscopy," ACM Transactions on Graphics, vol. 25, No. 3, Proceedings SIGGRAPH 2006.

Levoy, et al.,"Light Field Rendering" SIGGRAPH 96 Proceeding, 1996. pp. 31-42.

Levoy, M., "Light Fields and Computational Imaging" IEEE Computer Society, Aug. 2006, pp. 46-55.

Levoy, Marc, "Autofocus: Phase Detection", http://graphics.stanford.edu/courses/cs178/applets/autofocusPD.html, pp. 1-3, 2010.

Levoy, M., "Autofocus: Contrast Detection", http://graphics.stanford.edu/courses/cs178/applets/autofocusPD.html, pp. 1-3, 2010.

Maeda, Y., et al., "A CMOS Image Sensor with Pseudorandom Pixel Placement for Clear Imaging", 2009 International Symposium on Intelligent Signal Processing and Communication Systems, Dec. 2009.

Meynants, G., et al., "Pixel Binning in CMOS Image Sensors", Frontiers in Electronic Imaging Conference, 2009.

Nakamura, J., "Image Sensors and Signal Processing for Digital Still Cameras" (Optical Science and Engineering), 2005.

Ng, R., et al. "Light Field Photography with a Hand-held Plenoptic Camera," Stanford Technical Report, CSTR 2005-2, 2005.

Ng, R., "Digital Light Field Photography," Dissertation, Department of Computer Science, Stanford University, Jun. 2006.

Ng., R., "Fourier Slice Photography," ACM Transactions on Graphics, Proceedings of SIGGRAPH 2005, vol. 24, No. 3, 2005, pp. 735-744.

Digital Photography Review "Sony announce new RGBE CCD", Jul. 2003.

Stensvold, M., "Hybrid AF: A New Approach to Autofocus Is Emerging for both Still and Video", Digital Photo Magazine, Nov. 13, 2012.

Teranishi, N., "Evolution of Optical Structure in Image Sensors", Electron Devices Meeting (IEDM) 2012 IEEE International.

Compression standard JPEG XR: http://en.wikipedia.org/wiki/JPEG_XR. Retrieved Jan. 2013.

Methods of Variable Bitrate Encoding (http://en.wikipedia.org/wiki/Variable_bitrate#Methods_of_VBR_encoding). Retrieved Jan. 2013.

Lazy loading of image data (http://en.wikipedia.org/wiki/Lazy_loading). Retrieved Jan. 2013.

Key framing for video animation (http://en.wikipedia.org/wiki/Key_frame). Retrieved Jan. 2013.

Bayer Filter: http://en.wikipedia.org/wiki/Bayer_filter. Retrieved Jun. 20, 2013.

(56) References Cited

OTHER PUBLICATIONS

CYGM Filter: http://en.wikipedia.org/wiki/CYGM_filter. Retrieved Jun. 20, 2013.
Wippermann, F., "Chirped Refractive Microlens Array", Dissertation 2007.
National Instruments, "Anatomy of a Camera", pp. 1-5, Sep. 6, 2006.

* cited by examiner

OPTIMIZATION OF OPTICAL SYSTEMS FOR IMPROVED LIGHT FIELD CAPTURE AND MANIPULATION

CROSS-REFERENCE TO RELATED APPLICATIONS

The present application claims priority as a divisional of U.S. Utility application Ser. No. 13/888,192 for "Optimization of Optical Systems for Improved Light Field Capture and Manipulation, filed on May 6, 2013, the disclosure of which is incorporated herein by reference in its entirety.

U.S. Utility application Ser. No. 13/888,192 claims priority from U.S. Provisional Application Ser. No. 61/644,851 for "Optimization of Optical Systems for Improved Light Field Capture and Manipulation, filed on May 9, 2012, the disclosure of which is incorporated herein by reference in its entirety.

The present application is related to U.S. Utility application Ser. No. 13/027,946 for "3D Light Field Cameras, Images and Files, and Methods of Using, Operating, Processing and Viewing Same", filed on Feb. 15, 2011, the disclosure of which is incorporated herein by reference in its entirety.

FIELD OF THE INVENTION

The present invention relates to systems and methods for optimizing optical systems for improved capture and manipulation of light field image data.

BACKGROUND

Light field capture devices, such as, for example, light field still and video cameras, can be used to capture, and optionally process, light field image data. Some light field capture devices can also accept and act upon user input and display or otherwise output images and/or other types of data. Light field capture devices can include a variety of different optical components used to capture light field image data, including sensors (such as CCD or CMOS sensors), microlens arrays, main lenses, and/or lens arrays.

Light field capture devices may capture light field image data using any suitable method for doing so. One example of such a method includes, without limitation, using a microlens array on top of an image sensor (e.g., a CCD or CMOS sensor) as described in Ng et al., Light field photography with a hand-held plenoptic capture device, Technical Report CSTR 2005-02, Stanford Computer Science. Other examples include the use of a plurality of independently controlled cameras, each with its own lens and sensor, an array of cameras that image onto a single shared sensor, a plenoptic lens, and/or any combination of these.

In many environments, light field capture devices capture light field image data in the form of highly modulated 4D data that can then be processed to generate 2D and/or 3D output images which can be viewed by a user. Examples of such processing may include (but are not limited to) generating refocused images, parallax views or perspective-shifted images, all-in-focus or extended depth of field (EDOF) images, depth maps, 3D/stereo images, and any combination thereof.

Such processing of light field image data can be expensive in terms of computational resources, memory bandwidth, and/or power requirements. Thus, in many conventional systems, sacrifices are made in image quality, processing time, resolution, and the like, in order to facilitate light field capture. Users are therefore forced to trade off between the flexibility and capabilities of light field image capture, on the one hand, and high levels of image quality and resolution on the other.

SUMMARY

According to various embodiments of the present invention, optical systems of light field capture devices are optimized so as to improve captured light field image data. Such improvements can be measured by one or more metrics, including (but not limited to) image quality, processing efficiency, and generated image resolution. According to various embodiments, any of a plurality of methods, systems, and algorithms can be applied in order to process light field image data that has been captured by a light field capture device comprising one or more of the optical system optimizations enumerated herein.

According to various embodiments, optical systems of light field capture devices are optimized to result in captured light field image data (both still and video) that is cheaper and/or easier to process. For example, in at least one embodiment, optical systems are optimized to yield improved quality or resolution when using cheaper processing approaches whose computational costs fit within various processing and/or resource constraints. As such, the optical systems of light field cameras can be optimized to reduce size and/or cost and/or increase the quality of such optical systems. Such optimizations may be particularly useful in contexts where processing power and/or device size may be limited, such as for example in the context of a mobile device such as a smartphone.

According to various embodiments, the present invention can include one or more of the following components or aspects, singly or in any suitable combination:

Modifying the sensor read-out capabilities of digital image sensors that may be used in conjunction with a microlens array to capture light field image data, such that read-out modes are tailored for light field image data capture. In particular, read-out modes that perform a reduction in data size by binning or skipping pixels are optimized to result in less degradation of the light field image data.

Modifying the sensor's color filter array (CFA) grid layout/pattern based on the disk pattern in the light field image formed on the sensor; this can include, for example, selecting the CFA color of each pixel based on its light field coordinates, as described in more detail below.

Varying pixel properties such as exposure durations and pixel gains as a function of the pixel's light field coordinates, as defined in more detail below.

Jittering the positions of pixels on a sensor and/or microlenses in a microlens array.

Modifying the design of the microlens array and main lens design and placement within the optical system to produce disk images with vertical and/or horizontal pitches of integer numbers of sensor pixels, where the integer pitch is chosen to enable processing approaches that are cheaper, faster, and/or higher quality.

Modifying the design of the microlens array and main lens to increase the maximum acceptable chief ray angle (CRA) of the optical system.

Positioning and/or orienting a microlens array on top of a digital image sensor based on the available read-out modes and/or capabilities of the sensor.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

For purposes of the description provided herein, the following definitions are used:
- capture: can refer to either or both of still capture or video capture.
- image: a two-dimensional array of pixel values, or pixels, each specifying a color.
- light field image: an image that contains a representation of light field image data captured at the sensor.
- microlens: a small lens, typically one in an array of similar microlenses.
- color filter array (CFA): a mosaic of color filters placed over the pixel sensors of an image sensor to capture color information.

Optical systems are defined herein to encompass any or all components of the optical path of any suitable light field capture device, including any sensors (such as CCD or CMOS sensors), microlens arrays, main lenses, and/or lens arrays.

Light field capture devices are defined herein as any devices that are capable of capturing light field image data, optionally processing light field image data, optionally accepting and acting upon user input, and optionally displaying or otherwise outputting images and/or other types of data. Examples of light field capture devices include (but are not limited to) light field still and video cameras.

In addition, for ease of nomenclature, the term "camera" is used herein to refer to an image capture device or other image data acquisition device. Such a data acquisition device can be any device or system for acquiring, recording, measuring, estimating, determining and/or computing data representative of a scene, including but not limited to two-dimensional image data, three-dimensional image data, and/or light field image data. Such a data acquisition device may include optics, sensors, and image processing electronics for acquiring data representative of a scene, using techniques that are well known in the art. One skilled in the art will recognize that many types of data acquisition devices can be used in connection with the present invention, and that the invention is not limited to cameras. Thus, the use of the term "camera" herein is intended to be illustrative and exemplary, but should not be considered to limit the scope of the invention. Specifically, any use of such term herein should be considered to refer to any suitable device for acquiring image data.

In the following description, several techniques and methods for optimizing optical systems for improved light field capture and manipulation are described. One skilled in the art will recognize that these various techniques and methods can be performed singly and/or in any suitable combination with one another.

Architecture

Figure 1A:
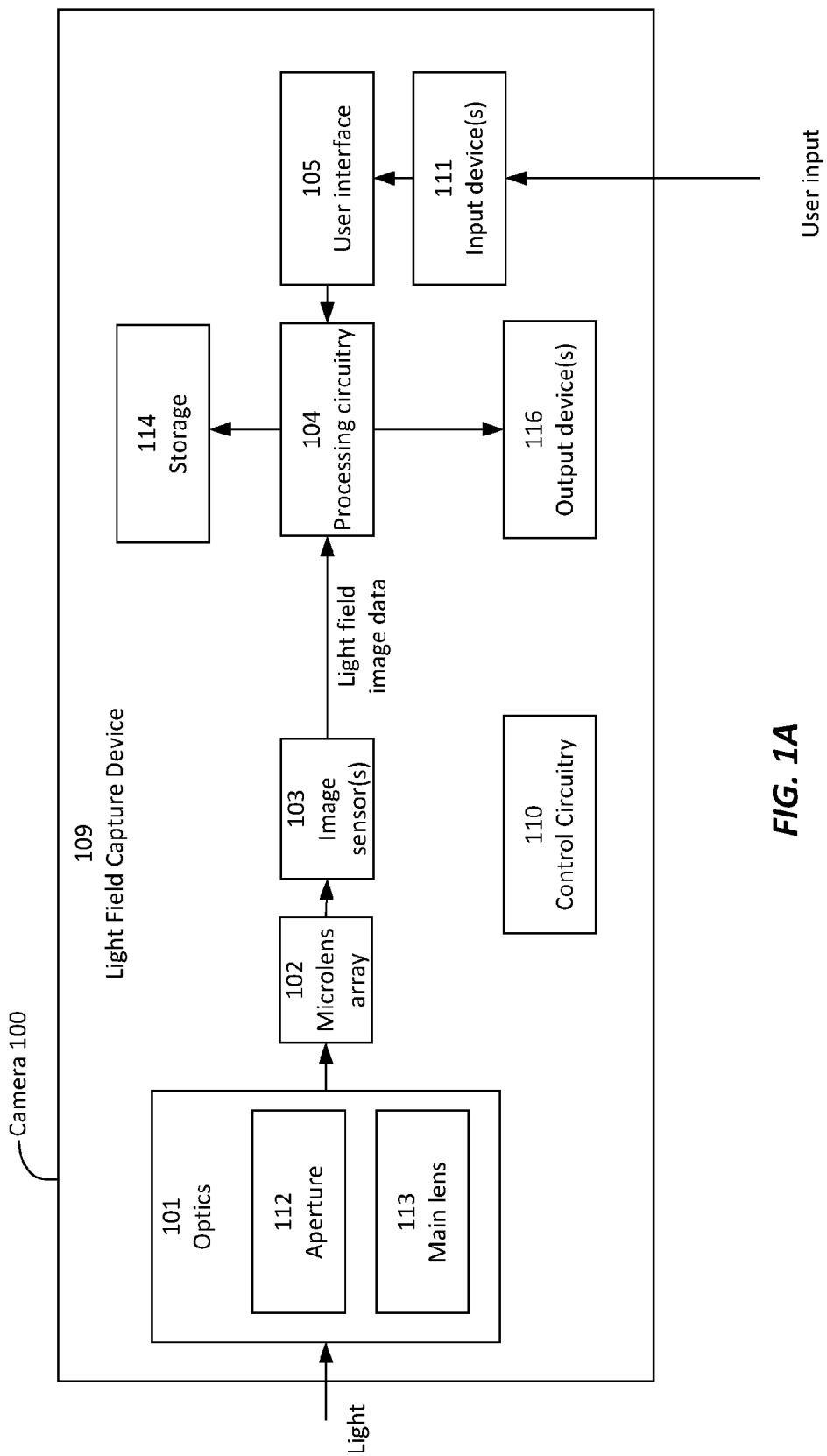
FIG. 1A depicts an example architecture for a light field capture device, according to one embodiment.

In at least one embodiment, the system and method described herein can be implemented in connection with light field images captured by light field capture devices including but not limited to those described in Ng et al., Light field photography with a hand-held plenoptic capture device, Technical Report CSTR 2005-02, Stanford Computer Science. Referring now to FIG. 1A, there is shown a block diagram depicting an architecture for implementing the present invention in a light field camera 100, according to one embodiment. Examples of light field camera 100 include (but are not limited to) light field still and video cameras. One skilled in the art will recognize that the particular configuration shown in FIG. 1A is merely exemplary, and that other architectures are possible for light field camera 100. One skilled in the art will further recognize that several of the components shown in the configuration of FIG. 1A are optional, and may be omitted or reconfigured.

Figure 1B:
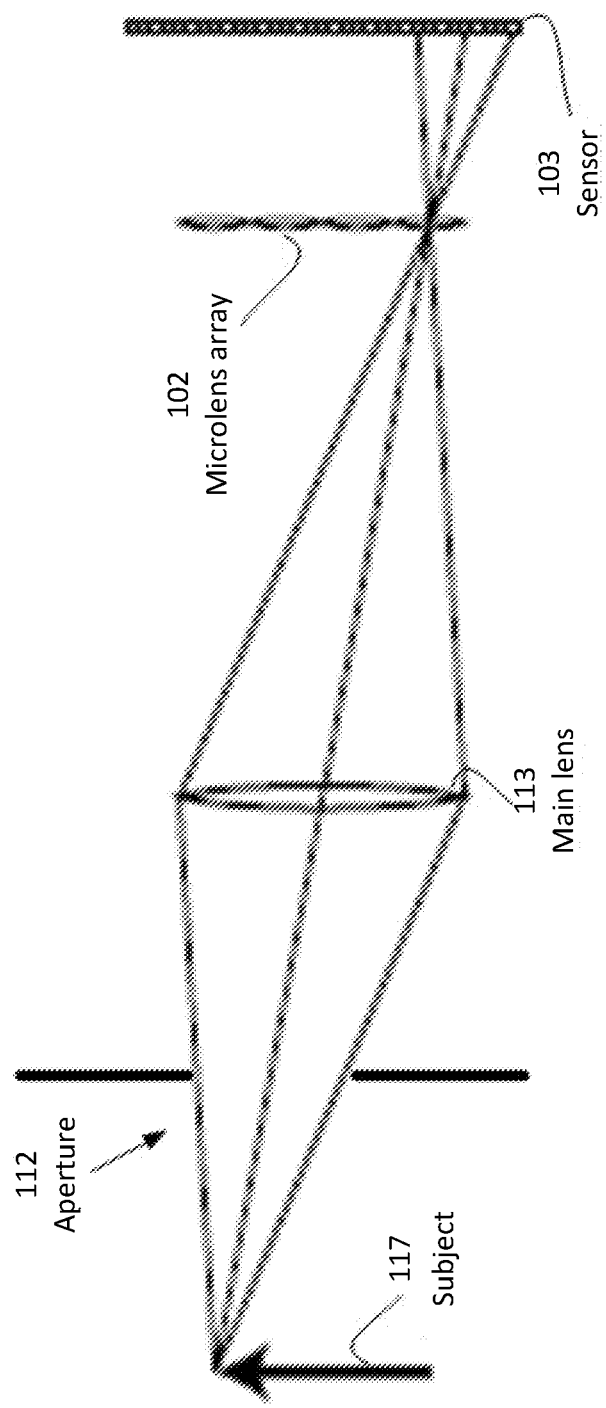
FIG. 1B depicts an example architecture for a light field capture device for implementing the present invention according to one embodiment.

As shown, light field camera 100 is one example of a light field capture device 109; for ease of nomenclature, the terms are used interchangeably, although any suitable light field capture device 109 can be used in place of camera 100. Light field capture device 109 includes optics 101, microlens array 102, and image sensor 103 (including a plurality of individual sensors for capturing pixels). Optics 101 may include, for example, aperture 112 for allowing a selectable amount of light into light field camera 100, and main lens 113 for focusing light toward microlens array 102. In at least one embodiment, microlens array 102 may be disposed and/or incorporated in the optical path of camera 100 (between main lens 113 and sensor 103) so as to facilitate acquisition, capture, sampling of, recording, and/or obtaining light field image data via sensor 103. Referring momentarily to FIG. 1B, there is shown an example of an architecture for a light field camera 100 for implementing the present invention according to one embodiment. The Figure is not shown to scale. FIG. 1B shows, in conceptual form, the relationship between aperture 112, main lens 113, microlens array 102, and sensor(s) 103, as such components interact to capture light field image data for subject 117.

Referring again to FIG. 1A, light field image data from sensor(s) 103 can be processed by processing circuitry 104, and presented as output on output device(s) 116. In at least one embodiment, the output presented at output device(s) 116 can be 2D images or projections of light field image data, as generated by processing circuitry 104.

In at least one embodiment, light field camera 100 may also include control circuitry 110 for facilitating acquisition, sampling, recording, and/or obtaining light field image data. For example, control circuitry 110 may manage and/or control (automatically or in response to user input) the acquisition timing, rate of acquisition, sampling, capturing, recording, and/or obtaining of light field image data.

In at least one embodiment, captured light field image data is provided to processing circuitry 104. Processing circuitry 104 may be disposed in or integrated into light field capture device 109 (as shown in FIG. 1A), or it may be in a separate component external to light field capture device 109. Such separate component may be local or remote with respect to light field image capture device 109. Any suitable wired or wireless protocol can be used for transmitting light field image data to circuitry 104; for example device 109 can transmit light field image data and/or other data via the Internet, a cellular data network, a WiFi network, a BlueTooth communication protocol, and/or any other suitable means.

Generally, processing circuitry 104 operates on light field image data received from light field sensor(s) 103, to generate any output, such as, for example, still images, 2D video streams, and the like. In various embodiments, processing circuitry 104 can use any suitable method of generating still images, 2D images, and the like from light field image data, including (but not limited to) those described below and in related cross-referenced applications.

In at least one embodiment, light field camera 100 may also include a user interface 105 allowing a user to provide user input for controlling the operation of camera 100 for capturing, acquiring, storing, and/or processing image data. In at least one embodiment, user preferences may also be used, as specified by the user in a preferences screen, or as provided based on defaults. User input can be provided to user interface 105 via any suitable user input device(s) 111 such as a touchscreen, buttons, keyboard, pointing device, and/or the like. As such, input received at input device(s) 111 can be used to control and/or configure either of processing circuitry 104 and control circuitry 110.

In at least one embodiment, camera 100 includes one or more storage device(s) 114, such as memory for storing image data output from light field sensor(s) (and potentially processed by processing circuitry 104). The memory can include external and/or internal memory. In at least one embodiment, the memory can be provided at a separate device and/or location from camera 100.

For example, camera 100 may store raw light field image data, as output by sensor 103, and/or a representation thereof, such as a compressed image data file. In addition, as described in related U.S. Utility application Ser. No. 12/703, 367 for "Light field Camera Image, File and Configuration Data, and Method of Using, Storing and Communicating Same,", filed Feb. 10, 2010, the memory can also store data representing the characteristics, parameters, and/or configurations (collectively "configuration data") of device 109.

Overview

Light field images often include a plurality of projections (which may be circular or of other shapes) of aperture 112 of camera 100, each projection taken from a different vantage point on camera's 100 focal plane. The light field image may be captured on sensor 103. The interposition of microlens array 102 between main lens 113 and sensor 103 causes images of aperture 112 to be formed on sensor 103, each microlens in array 102 projecting a small image of main-lens aperture 112 onto sensor 103. These aperture-shaped projections are referred to herein as disks, although they need not be circular in shape.

Figure 2:
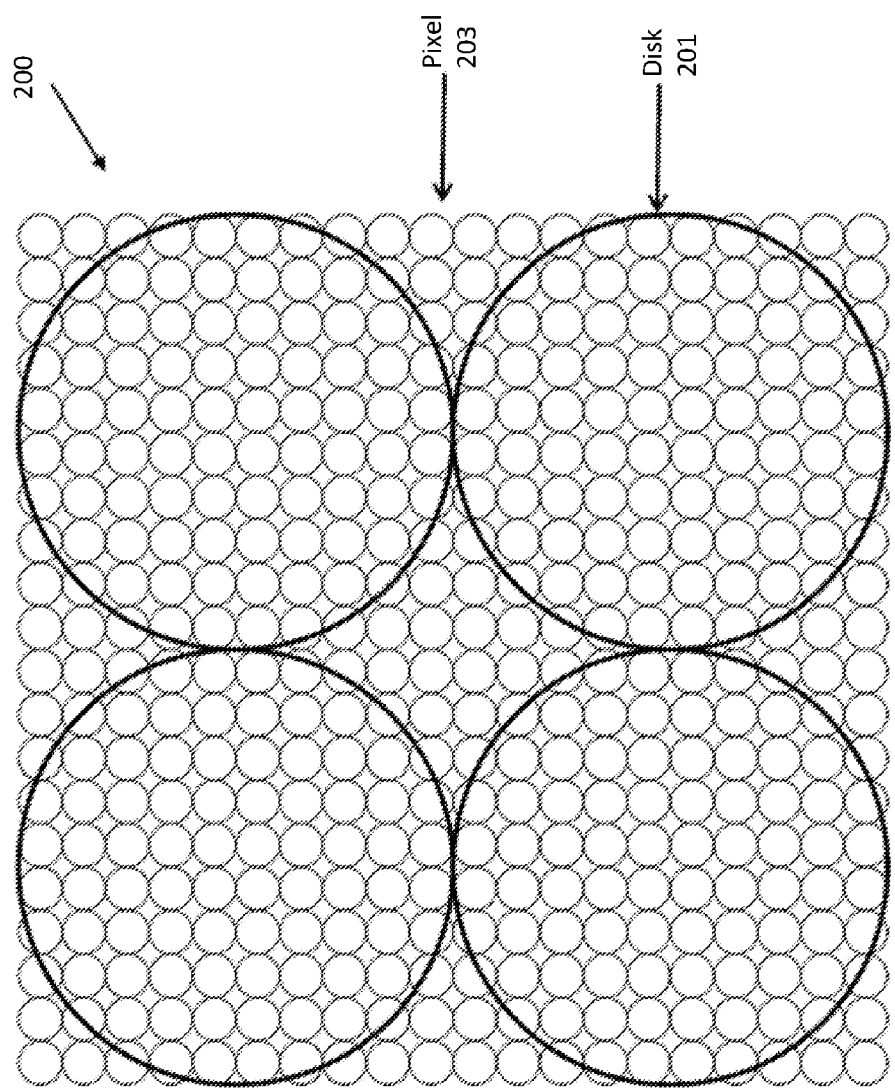
FIG. 2 depicts a portion of a light field image.

Light field images include four dimensions of information describing light rays impinging on the focal plane of camera 100 (or other capture device). Two spatial dimensions (herein referred to as x and y) are represented by the disks themselves. For example, the spatial resolution of a light field image with 120,000 disks, arranged in a Cartesian pattern 400 wide and 300 high, is 400×300. Two angular dimensions (herein referred to as u and v) are represented as the pixels within an individual disk. For example, the angular resolution of a light field image with 100 pixels within each disk, arranged as a 10×10 Cartesian pattern, is 10×10. This light field image has a 4-D (x,y,u,v) resolution of (400,300,10,10). Referring now to FIG. 2, there is shown an example of a 2-disk by 2-disk portion of such a light field image 200, including depictions of disks 201 and individual pixels 203; for illustrative purposes, each disk 201 is ten pixels 203 across.

Accordingly, an image formed on sensor 103 of light field capture device 109 includes a set of small images, referred to as "disk images" (though they need not be circular in shape), which encode a set of 4D light field image data. Each pixel 203 on sensor 103 may be interpreted as corresponding to a particular 4D light field coordinate, where two dimensions specify its spatial position on the sensor, and two dimensions specify the angular or directional information of light that is incident upon that pixel 203. The 2D directional information is encoded by the 2D position of pixel 203 within the disk image of which it is a member.

Figure 3A:
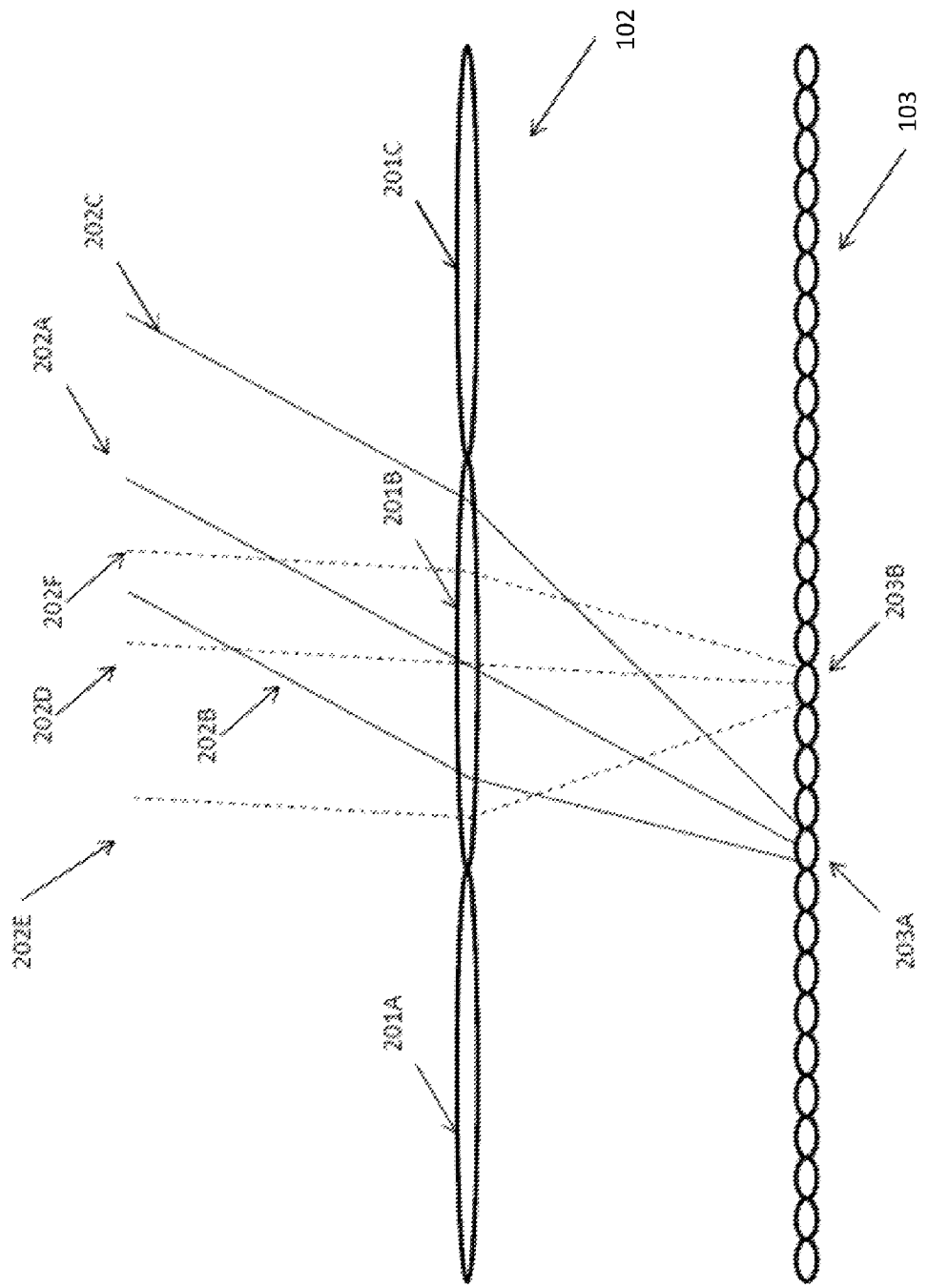
FIG. 3A depicts transmission of light rays through a microlens to illuminate pixels in a digital sensor.

Many light rays in the light field within a light field camera contribute to the illumination of a single pixel 203. Referring now to FIG. 3A, there is shown an example of transmission of light rays 202, including representative rays 202A, 202D, through microlens 201B of array 102, to illuminate sensor pixels 203A, 203B in sensor 103.

In the example of FIG. 3A, solid rays 202A, 202B, 202C illuminate sensor pixel 203A, while dashed rays 202D, 202E, 202F illuminate sensor pixel 203B. The value at each sensor pixel 203 is determined by the sum of the irradiance of all rays 202 that illuminate it. For illustrative and descriptive purposes, however, it may be useful to identify a single geometric ray 202 with each sensor pixel 203. That ray 202 may be chosen to be representative of all the rays 202 that illuminate that sensor pixel 203, and is therefore referred to herein as a representative ray 202. Such representative rays 202 may be chosen as those that pass through the center of a particular microlens 201, and that illuminate the center of a particular sensor pixel 203. In the example of FIG. 3A, rays 202A and 202D are depicted as representative rays; both rays 202A, 202D pass through the center of microlens 201B, with ray 202A representing all rays 202 that illuminate sensor pixel 203A and ray 202D representing all rays 202 that illuminate sensor pixel 203B.

Figure 3B:
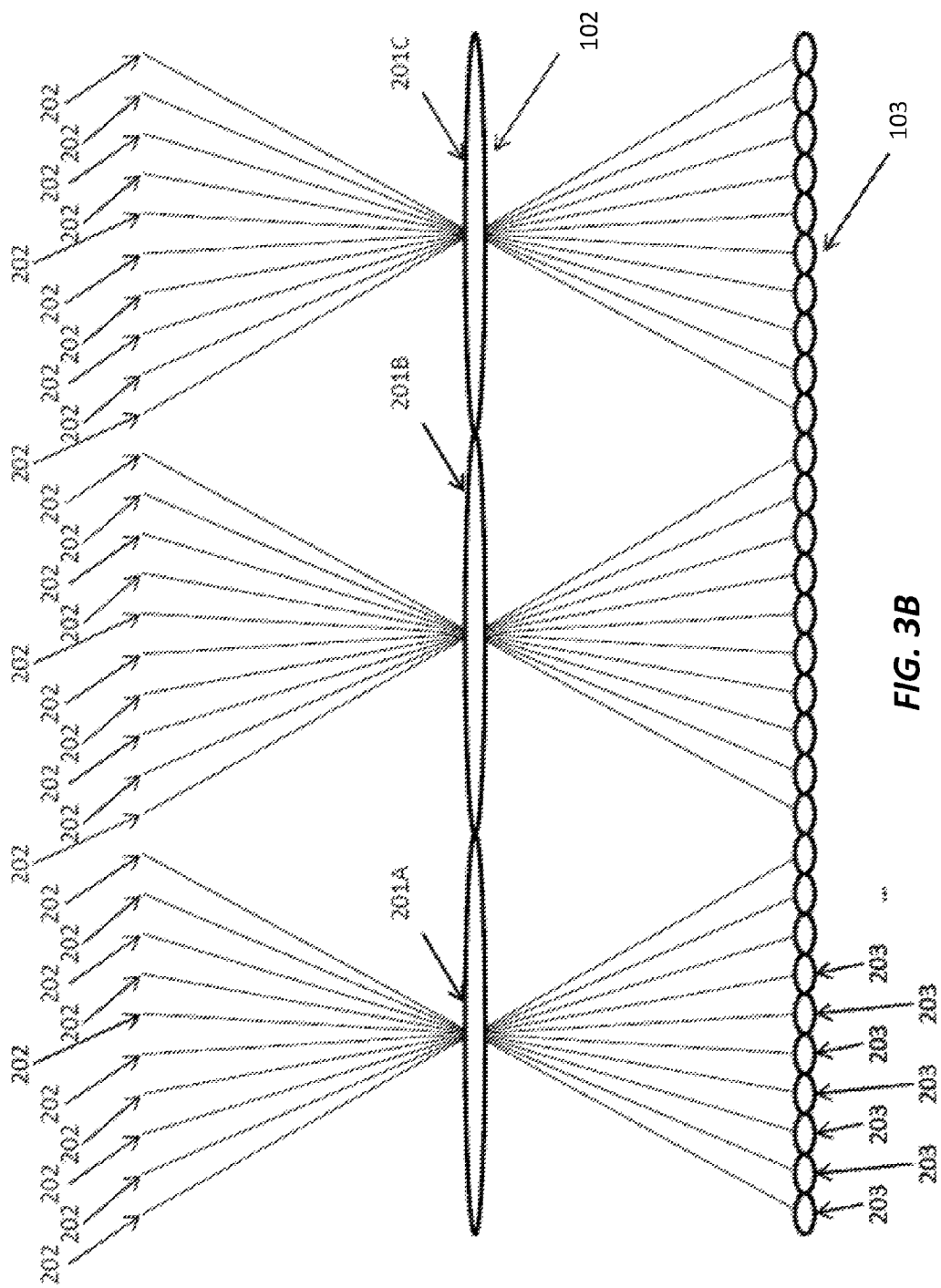
FIG. 3B depicts an arrangement of a light field capture device wherein a microlens array is positioned such that images of a main-lens aperture, as projected onto the digital sensor, do not overlap.

There may be a one-to-one relationship between sensor pixels 203 and their representative rays 202. This relationship may be enforced by arranging the (apparent) size and position of main-lens aperture 112, relative to microlens array 102, such that images of aperture 112, as projected onto sensor 103, do not overlap. Referring now to FIG. 3B, there is shown an example of an arrangement of a light field capture device, such as camera 100, wherein microlens array 102 is positioned such that images of a main-lens aperture 112, as projected onto sensor 103, do not overlap. The rays 202 depicted in FIG. 3B are representative rays 202, as they all pass through the center of one of microlenses 201 to the center of a pixel 203 of light field sensor 803.

Figure 4:
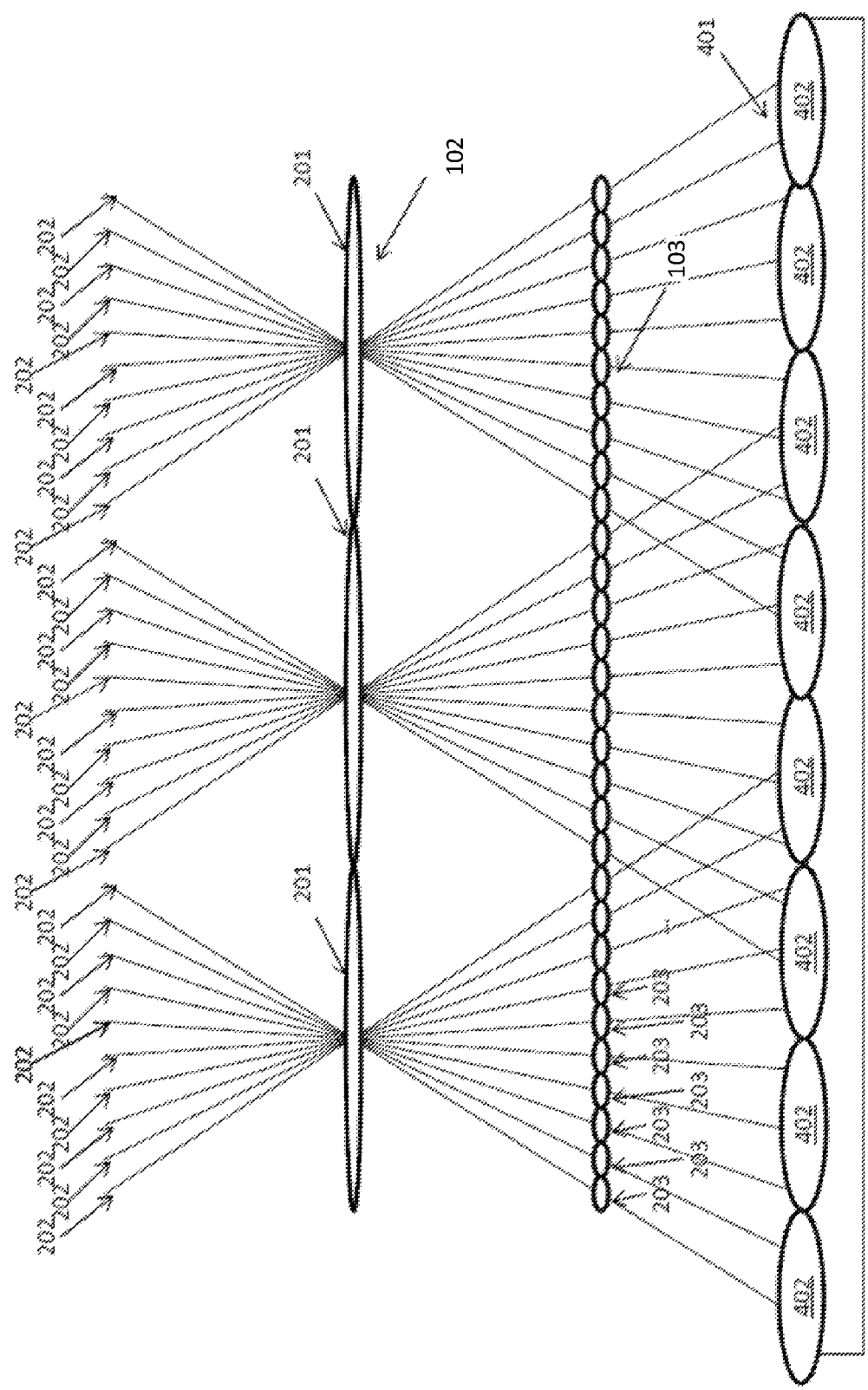
FIG. 4 depicts an example of projection and reconstruction to reduce a 4-D light field representation to a 2-D image.

In at least one embodiment, the 4-D light field representation may be reduced to a 2-D image through a process of projection and reconstruction. Referring now to FIG. 4, there is shown an example of such a process. A virtual projection surface 401 may be introduced, and the intersection of each representative ray 202 with projection surface 401 is computed. Projection surface 401 may be planar or non-planar. If planar, it may be parallel to microlens array 102 and sensor 103, or it may not be parallel. In general, projection surface 401 may be positioned at any arbitrary location with respect to microlens array 102 and sensor 103. The color of each representative ray 202 may be taken to be equal to the color of its corresponding pixel 203. In at least one embodiment, pixels 203 of sensor 103 may include filters arranged in a regular pattern, such as a Bayer pattern, and converted to full-color pixels. Such conversion can take place prior to projection, so that projected rays 202 can be reconstructed without differentiation. Alternatively, separate reconstruction can be performed for each color channel.

The color of an image pixel 402 on projection surface 401 may be computed by summing the colors of representative rays 202 that intersect projection surface 401 within the domain of that image pixel 402. The domain may be within the boundary of the image pixel 402, or may extend beyond the boundary of the image pixel 402. The summation may be weighted, such that different representative rays 202 contribute different fractions to the sum. Ray weights may be assigned, for example, as a function of the location of the intersection between ray 202 and projection surface 401, relative to the center of a particular pixel 402. Any suitable weighting algorithm can be used, including for example a bilinear weighting algorithm, a bicubic weighting algorithm and/or a Gaussian weighting algorithm.

During projection to a refocused 2-D image, representative rays 202 are intersected with virtual projection surface 401 that is parallel to microlens array 102, but displaced from it. If virtual projection surface 401 is ahead of microlens array 102 (nearer to the scene), then the reconstructed 2-D image is focused at a virtual projection surface 401 that is ahead of the best focus scene plane of the light field camera 100. (It is farther from the light field camera 100.) Likewise, if virtual projection surface 401 is behind microlens array 102 (farther from the scene) then the reconstructed 2-D image is focused at a virtual projection surface 401 that is behind the best-focus scene plane of the light field camera 100. Objects in the scene whose scene depths correspond to the image depth of virtual projection surface 401 are in essentially exact focus; other objects in the scene are projected with blur that increases with their displacement from that scene depth.

A depth map is a set of image-side points (points on the image side of main lens 113), each of which corresponds to a visible point in the scene. A point in the scene is visible if light emitted from it reaches the anterior nodal point of main lens 113, either directly or by being reflected from a highly specular surface. The correspondence is such that light emitted from the scene point would be in best focus by main lens 113 at the corresponding image-side point.

The position of an image-side point in a depth map may be specified in Cartesian coordinates, with x and y indicating position as projected onto light field sensor(s) 103 (x positive to the right, y positive up, when viewing toward the scene along the optical axis of main lens 113), and depth d indicating perpendicular distance from the surface of microlens array 102 (positive toward the scene, negative away from the scene). The units of x and y may be pixels 203—the pixel pitch of sensor 103. The units of d may be lambdas, where a distance of one lambda corresponds to the distance along which a cone of light from any scene point changes its diameter by a value equal to the pitch of microlens array 102. (The pitch of microlens array 102 is the average distance between the centers of adjacent microlenses 201.)

Thus, for scene-side points that are directly visible to main lens 113, points at scene depths on the plane of the optical focus correspond to an image depth at the (microlens) surface. Points at scene depths that are farther from light field camera 100 than the plane of best focus correspond to points with image depths that are closer to main lens 113 than the plane of best focus. As such, points at scene depths that are farther from light field camera 100 than the plane of best focus have positive depth values. Points at scene depths that are nearer to camera 100 than the plane of best focus correspond to points with image depths that are farther from main lens 113 than the plane of best focus. As such, points at scene depths that are nearer to camera 100 than the plane of best focus have negative depth values.

According to various embodiments of the present invention, any number of modifications can be performed in order to optimize optical systems of light field capture devices 109 to improve captured light field image data. Examples of such modifications are described herein. One skilled in the art will recognize that these modifications can be applied singly or in any suitable combination.

Sensor Read-Out Modifications

According to at least one embodiment, the sensor read-out capabilities of digital image sensors, for example, light field sensors 103, are modified. Sensor read-out modifications can be used in conjunction with a microlens array, for example, microlens array 102, to capture light field image data, such that the sensor's read-out modes are tailored for light field image data capture. The read-out modes are optimized to result in less degradation of light field image data. A number of different read-out modifications are listed herein; however, this list is exemplary. Any or all of these modifications can be applied singly or in any suitable combination.

Figure 5:
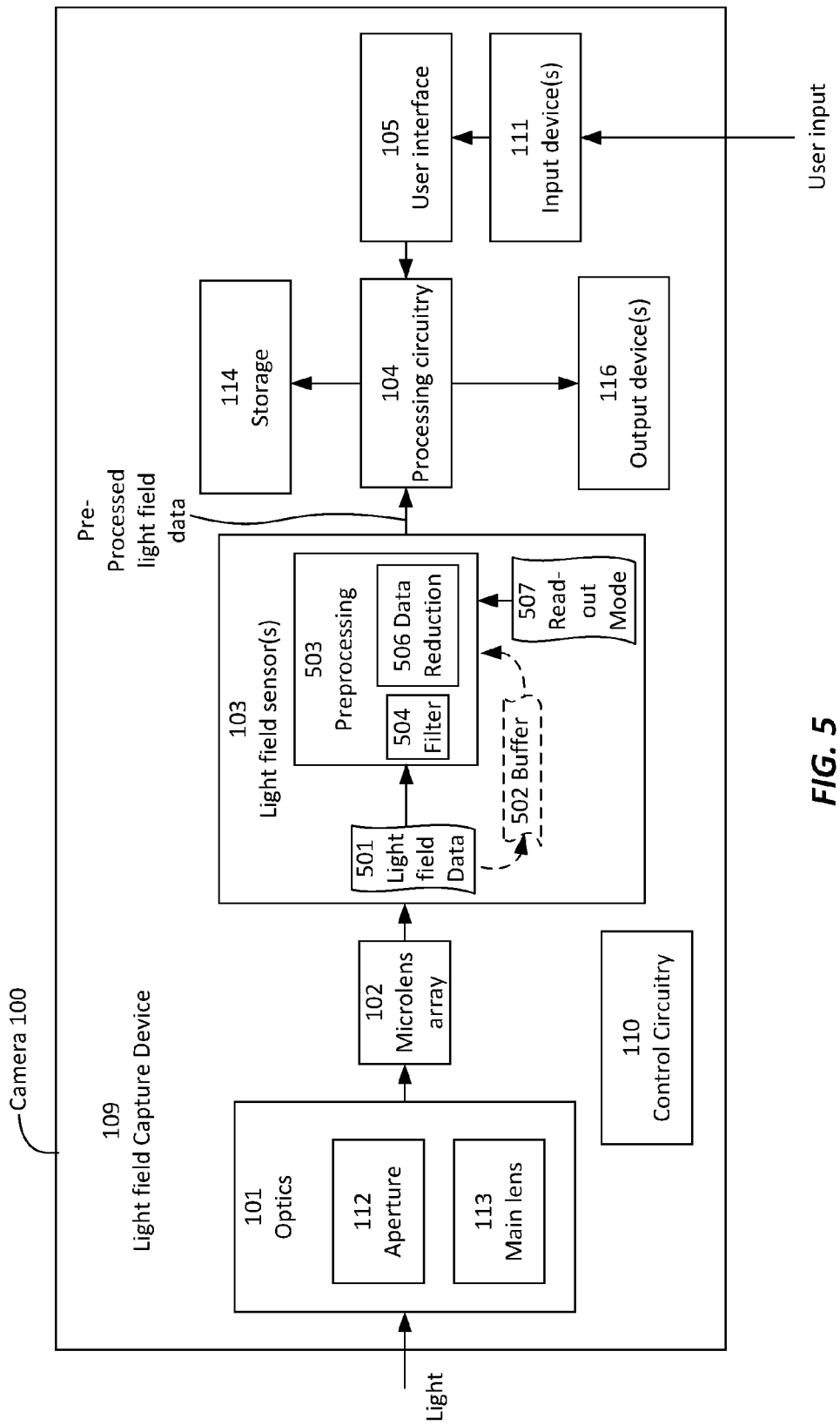
FIG. 5 depicts another example architecture of a light field capture device, according to one embodiment.

Referring now to FIG. 5, there is shown another example architecture of a light field capture device 109 according to one embodiment. As depicted in FIG. 5, light field sensors 103 include buffer 502 and preprocessing 503. Preprocessing 503 further includes filter 504 and data reduction 506. Generally, light field sensors 103 can capture light field image data 501 from the output of microlens array 102 (e.g., as described in connection with FIGS. 1A through 4). Some or all of light field image data 501 can be buffered in buffer 502 and/or sent to preprocessing 503.

Preprocessing 503 can process light field image data 501 in accordance with read-out mode 507 to reduce the data size of the captured light field image data without any appreciable degradation. Preprocessing 503 can output pre-processed light field image data to processing circuitry 104 for further processor, for example, to generate a 2D image.

In at least one embodiment, filter 504 filters light field image data 501 to reduce the size of light field image data 501. Filtered light field image data can be stored in buffer 502. Data reduction 506 can access light field image data 501 and/or can access filtered light field image data from buffer 502. Data reduction 506 can implement one or more mechanisms to reduce the size of light field image data. In some embodiments, data reduction 506 uses one of or more of: skipping pixels 203, binning pixels 203, sub-sampling pixels 203, resampling pixels 203, per-pixel operations, per-pixel values, bitmasks, bitmask tiles, weight image tiles, bit depth modifications, pixel maximums, lookup tables, multi-pass read outs, light field aware processing, and sensors with interlaced scan to reduce the size of light-field data.

Figure 6:
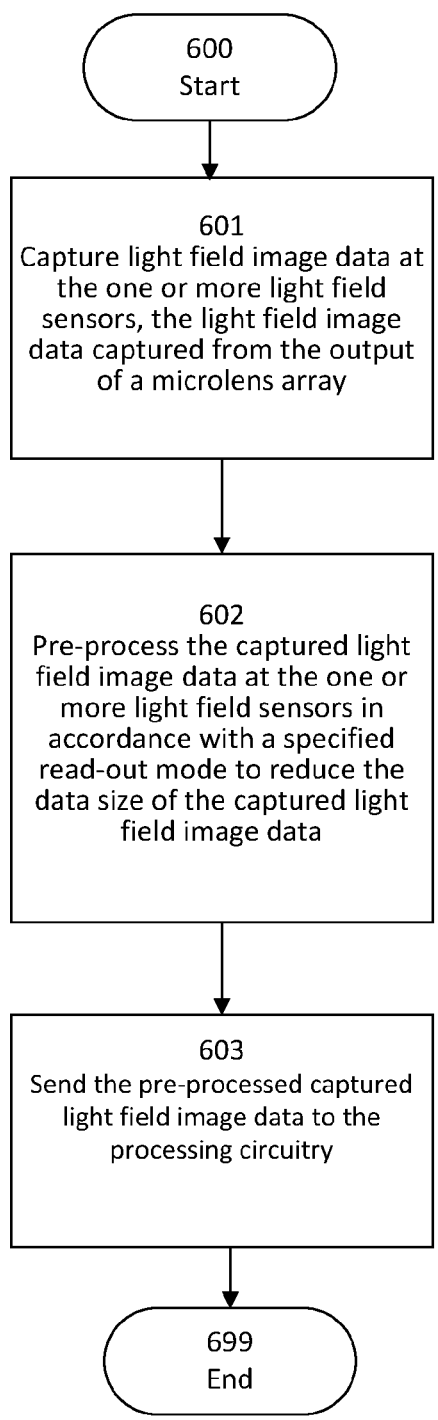
FIG. 6 is a flow diagram depicting a method for reducing the size of captured light field image data, according to one embodiment.

Referring now to FIG. 6, there is shown a flow diagram depicting a method for reducing the size of captured light field image data. The method of FIG. 6 will be described with respect to the components and data in FIG. 5.

In at least one embodiment, one or more light field sensors 103 capture 601 light field image data 501 from the output of microlens array 102. The captured light field image data 501 is pre-processed 602 at the one or more light field sensors 103 in accordance with a specified read-out mode to reduce the data size of the captured light field image data. For example, preprocessing 503 can process light field image data 501 in accordance with read-out mode 507 to reduce the size of light field image data 501. The pre-processed captured light field image data is then sent 603 to processing circuitry 104.

Pre-Filtering the Sensor Image Data

In at least one embodiment, image data 501 is filtered prior to being read out of sensor 103. When a sub-sampled, binned, or resampled read-out mode is utilized, the filtering can occur prior to the sub-sampling, binning, or resampling. For example, one read-out mode may involve skipping columns, and a horizontal filter may be applied to the sensor data prior to this skipping.

In general, filtering can be horizontal, vertical, or two-dimensional. Two-dimensional filters may or may not be separable. Filtering may be implemented as a straightforward convolution of the image data with a provided mask. In at least one embodiment, filtering may be applied amongst pixels 203 of the same color. For example, in at least one embodiment, same-color filtering can be used for an image sensor in which different pixels 203 represent different colors (e.g., a sensor using a color-filter-array (CFA) such as a Bayer sensor), Alternatively, filtering of such an image may be implemented to consider pixels 203 from multiple colors, for example within a demosaicing algorithm.

Filtering can be implemented using a small amount of memory on the sensor itself to buffer rows as they are read from the array of pixels 203; such buffering of rows can be performed according to known techniques. Filtering operations may be applied to these buffered rows, and in the case of a vertical or two-dimensional filter, the number of buffered rows may need to be at least as large as the number of taps of the filter in the vertical dimension.

Once the data is filtered in a local buffer (such as buffer 502), subsequent operations including (but not limited to) sub-sampling, binning, or resampling may be applied, before the data is finally output from sensor 103.

One advantage of such a sensor capability is to pre-filter (possibly highly) modulated light field image data prior to it being sub-sampled, for example when the sensor image is being sub-sampled and scaled to fit an LCD screen for on-camera live-view operation. Sub-sampling and then downscaling the highly modulated light field image data without a sufficiently large pre-filtering operation may result in unattractive artifacts in the final image due to aliasing patterns.

The filtering may be spatially varying, or it may be uniform across the whole light field image. In the case of a spatially varying filter, the variations may be a function of the light field coordinates of the pixels 203 that are being filtered; such an approach can be used to apply larger filtering (and hence greater amounts of pixel aggregation) in highly modulated regions of the light field image.

Skipping Pixels Based on their Light Field Coordinates

In at least one embodiment, sensor read-out modes can skip pixels 203 based on their light field coordinates, rather than skipping pixels 203 using some (sensor-surface) uniform and/or light field-oblivious approach, such as skipping every second row or column.

As described above, light field images captured by placing a microlens array 102 above a sensor 103 may consist of a large number of disks 201. Pixels 203 which are nearer to the center of a disk 201 tend to be better illuminated and have a higher signal-to-noise ratio (SNR) than pixels 203 which are nearer to the boundary of a disk 201. In such a light field image, the two directional dimensions of the 4D coordinate space refer to the position of a pixel 203 within a disk 201, and selection of the pixels 203 which are to be skipped as a function of these directional dimensions may be performed to ensure that only pixels 203 closer to the center of a disk 201 are read out from the sensor 103.

Figure 7:
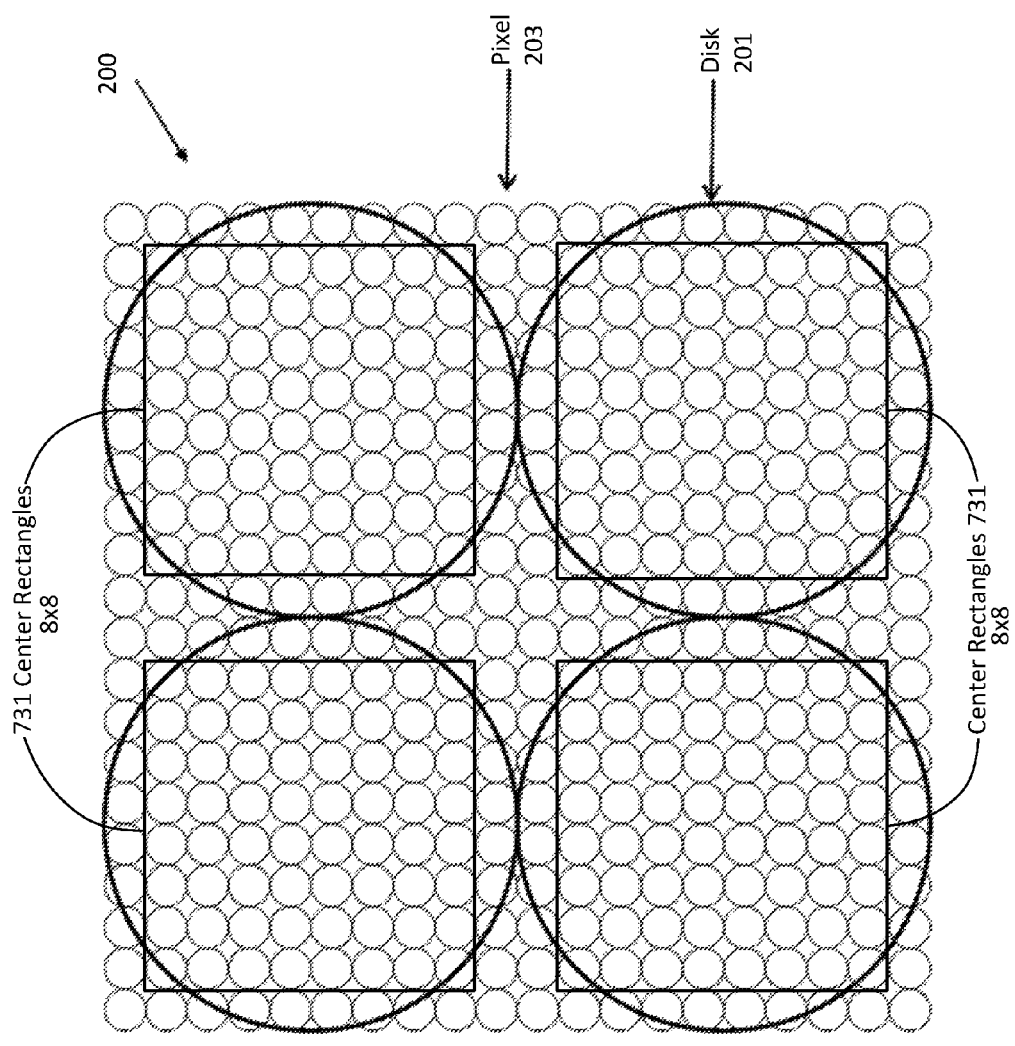
FIG. 7 depicts a portion of a light field image with center rectangles.

For example, as depicted in FIG. 7, given a configuration of light field sensor 103 and microlens array 102 such that the diameter of each disk image 201 is around 10 sensor pixels 203, an 8×8 center rectangle 731 of pixels 203 may be defined for each disk 201, so that rectangle 731 is close to being fully contained within disk 201. Sensor 103 may incorporate some amount of local memory for buffering rows of pixel data that may be used to pack the 8×8 rectangles 731 into a contiguous block prior to the data being read out of sensor 103.

In at least one embodiment, in which the sensor pixels 203 are a single color due to being under a color filter array (CFA), center rectangles 731 can be selected to pack together such that after they are packed, the resultant image is a legal example of the CFA pattern across the span of the resultant image. In the case of a (R,GR,GB,B) Bayer sensor, rectangles 731 can be chosen such that (for example) the same color pixel (e.g., R) is at the top-left of each 8×8 block.

The locations of the pixels 203 to skip and/or the pixel regions to pack together may be specified in any of a number of possible ways. One example is to provide the sensor coordinates of the center of each disk 201. This data may also be stored in the sensor in a small local memory (not shown) dedicated to this purpose.

Per-Pixel Read-Out Operations

In various embodiments, the system and method of the present invention provide sensor read-out patterns that are fully configurable and that may be specified or configured in a per-pixel manner.

In at least one embodiment, a bitmask may be provided which specifies, for every pixel 203, whether it is skipped or not, and the non-skipped pixels 203 may be packed together in the data that is output from sensor 103. Such a bitmask may be programmed into a local memory in sensor 103, or it may be provided in a DRAM or other memory that sensor 103 may access. Further, multiple bitmasks may be programmed into the sensor to allow rapid switching of read-out patterns.

In another embodiment, one or more bitmask tiles may be provided, and these tiles may be used repeatedly across different sensor regions to specify which pixels 203 are skipped.

In a further embodiment, rather than a bitmask specifying pixels 203 which are either read or skipped, a weight image, or one or more weight image tiles, may be provided. As with the bitmask approach described above, the read-out pattern may be specified on a per-pixel basis. However, in such an approach, rather than each pixel's corresponding bitmask Boolean entry specifying whether the pixel 203 is skipped, a per-pixel weighting factor (i.e., a multiplicative factor) may be specified, where such weights are multiplied with the pixel values that are read out. Moreover, any other skipping, binning, resampling, or aggregation of pixels 203 during read-out may be performed in conjunction with such a per-pixel weighting operation.

In another embodiment, in addition to or instead of per-pixel weighting data being provided, a per-pixel offset value may be provided, wherein the read-out pixel values are computed according to the following formula, where the computed pixel value is clamped to a legal pixel value range, as follows:

Pixel Value'=CLAMP(PerPixelOffset+
PerPixelWeight*Pixel Value,0,MAX)

One (of many) possible read-out patterns enabled by per-pixel specification of skipping is a random or pseudo-random pattern; for example, a repeating tiled pattern in which pixels 203 that are skipped have a set of locations that appears to be random.

In at least one embodiment, the arithmetic operations described herein may be implemented using standard fixed-point arithmetic.

Read-Out Bit Depth Modifications

In at least one embodiment, the read-out bit depths of digital image sensor 103 can be modified to take advantage of the large amount of pixel aggregation performed within light field processing algorithms. By utilizing an appropriate number of bits to encode each raw pixel 203 and defining the mapping function from raw linear values to encoded values, the read-out data rate from the sensor (measured in bytes/second) to attain a given number of pixels/second can be reduced. Any suitable encoding can be used to make use of the light field coordinates of pixels 203 and/or the light field disk pattern on sensor 103.

One exemplary encoding outputs raw data with a variable number of bits per pixel, where pixels 203 with "better" or "more" light capture during a sensor exposure may have their corresponding values encoded with a higher bit depth. For a light field image captured on sensor 103 beneath a microlens array 102 (according to the architecture described above, for example), the resultant disk image will have pixels 203 with more light captured closer to the centers of disks 201; therefore, more bits may be used to encode disk-center pixels vs. disk-edge pixels.

Another exemplary encoding may employ a pixel-specific maximum value to which pixel values are clamped. For example, in many cases, pixels near the centers of disks 201 in a light field image are much brighter than pixels near the edges of disks 201, except in the case of over-saturation. Disk-edge pixels may be clamped to a maximum value that is smaller than the values which disk-center pixels may hold.

A further embodiment may employ a combination of the variable bit depth and variable pixel maximum methods. An example of such a read-out pattern may employ 12 bits per pixel (bpp) to encode values in the range [0,4095] for disk-center pixels 203, and 6 bpp to encode values in the range [0,1023] for disk-edge pixels 203 (where the 64 possible encoded values are evenly spaced out within the range of 1024 pixel values).

In another exemplary embodiment, one or more lookup tables can be used to map sensor values to encoded values, wherein the lookup tables may be programmed by the user, and the choice of which lookup table to apply to any given pixel 203 is determined according to its light field coordinates, for example according to its position relative to the center of its disk 201. Different lookup tables, and even different entries within a lookup table, may or may not be of varying bit lengths, and the sequence of pixels 203 that is read out of the sensor may have any variable-sized pixel values packed together.

As with the pre-filtering embodiment, in at least one embodiment, such pixel bit depth modifications may be implemented by logic that operates on a small number of buffered rows of pixels 203 prior to being read out over the sensor interface.

Progressive Multi-Pass Read-Out

In at least one embodiment, the sensor image data can be read out in multiple passes, wherein each pass reads a set of rows that are spaced out across sensor 103 and are interleaved with the rows read out by other passes. Such a read-out method enables features such as the disentanglement of camera motion from object motion, and HDR imaging, by subsequent processing of the data.

The number of passes, and the corresponding set of rows read by each pass, may be hard-wired, or they may be programmable.

Performing Light Field-Aware Processing During Read-Out

In at least one embodiment, light field-aware processing can be performed on image sensor 103 such that the data that is read out from sensor 103 has been processed in some way. Examples of light field-aware processing operations include (but are not limited to):

Transposing light field image data from an "array of disks" format into an "array of sub aperture images" format;

Converting the 4D data to a 2D image, for example by refocusing it, by producing an all-in-focus or extended depth of field (EDOF) image, or by producing an image with a parallax or perspective shift.

Different Read-Out Patterns Across Different Frames

In at least one embodiment, different read-out patterns can be provided for different frames, in particular for video. In general, any of the read-out mode embodiments described herein may be varied across different frames.

Light Field Image Read-Out on a CCD Sensor

In at least one embodiment, at least some of the image read-out modes described herein can be implemented using a charge-coupled device (CCD) image sensor 103 if some or all of microlens array geometry is known or determined when image sensor 103 is fabricated. Unlike CMOS image sensors, CCDs generally do not have individually addressable pixels 203, and rely on the charge transfer for read-out. This presents a challenge for implementing arbitrary read-out modes on such an image sensor 103, because the local order and pattern of pixel read-out is fixed in the design of the semiconductor device itself.

One method for implementing full-resolution or reduced-resolution read-out modes that read out the pixels 203 in a specific order or fashion that is dependent on a particular microlens array geometry, or is otherwise well suited for microlens imaging, is to use an interline, frame-interline transfer or any other type of CCD image sensor 103 with interlaced scan. The image sensor 103 is constructed with per-pixel microlenses, photodiodes, transfer gates, vertical charged coupled devices (VCCDs), and/or other customary image sensor parts arranged in accordance with the geometry of the light field microlens array 102, so as to allow the implementation of a read-out mode (or modes) described herein. In other respects, image sensor 103 may be constructed in any fashion suitable for a CCD image sensor.

Figure 8:
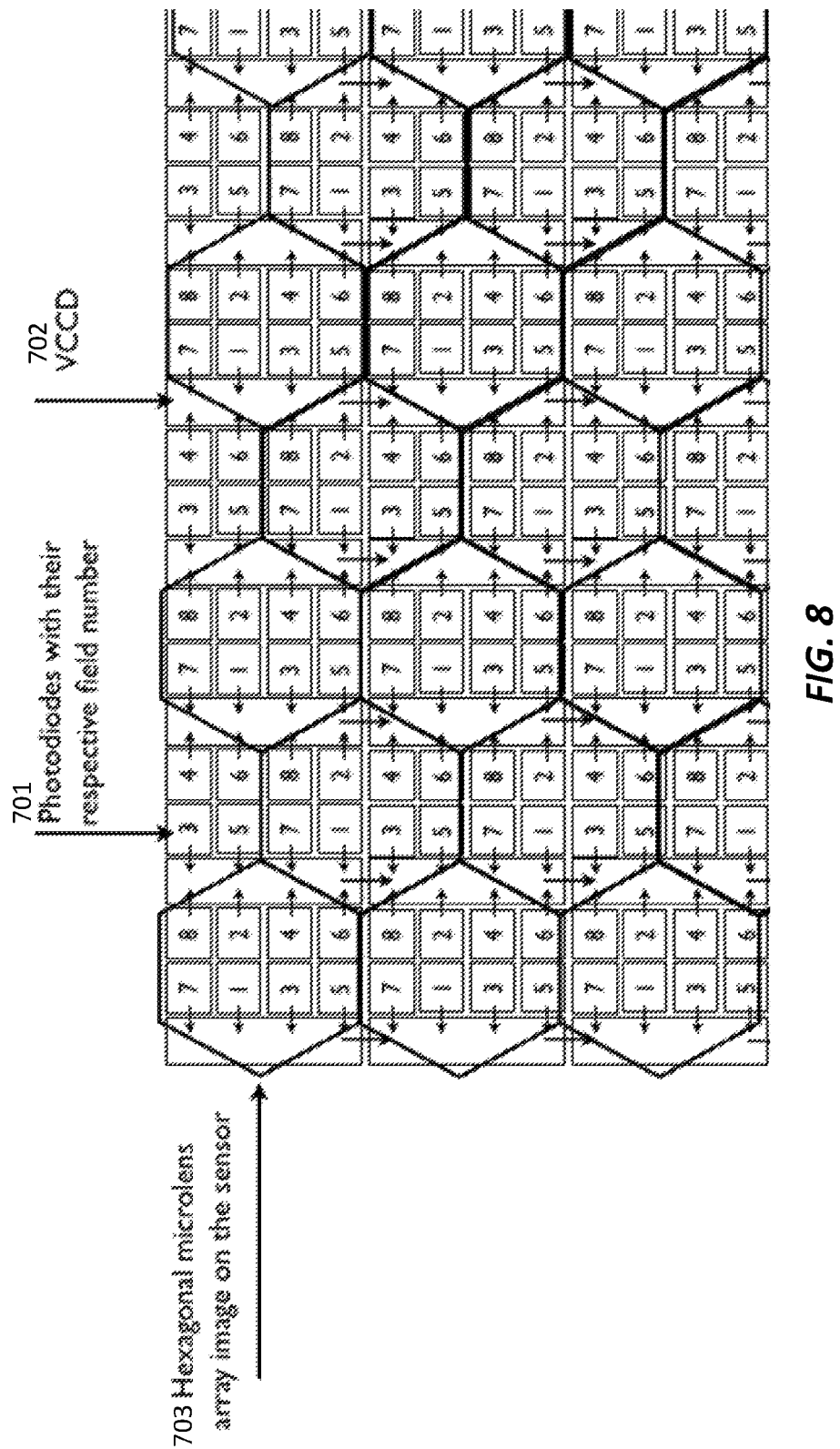
FIG. 8 depicts an example arrangement of photodiodes for a read-out mode that skips pixels that are near or on the edge between light field disk images, according to one embodiment.

Referring now to FIG. 8, there is shown an example arrangement of photodiodes 701 for a read-out mode that skips pixels 203 that are near or on the edge between light field disk images, according to one embodiment. FIG. 8 depicts a logical arrangement of photodiodes 701 and VCCDs 702 for an 8-field interlaced read-out imaging sensor with a hexagonal light field microlens array pattern 703. The transfer gates (or any other part of the metal layer), apertures, color filter array and per-pixel microlenses are omitted for clarity. The diagram is not to scale. In this example, reading out fields 1, 2, 3 and 4 gives a half-resolution mode that only covers pixels 203 in the center of the microlens array image.

Varying the Color Filter Array Pattern of the Image Sensor

In at least one embodiment, given a microlens array over an image sensor, for example, microlens array 102 over sensor 103, the color filter array (CFA) pattern that is applied to image sensor 103 can be modified to improve the quality of color information captured from the light field. The color chosen for each pixel 203 may (or may not) be a function of its light field coordinates.

Figure 9:
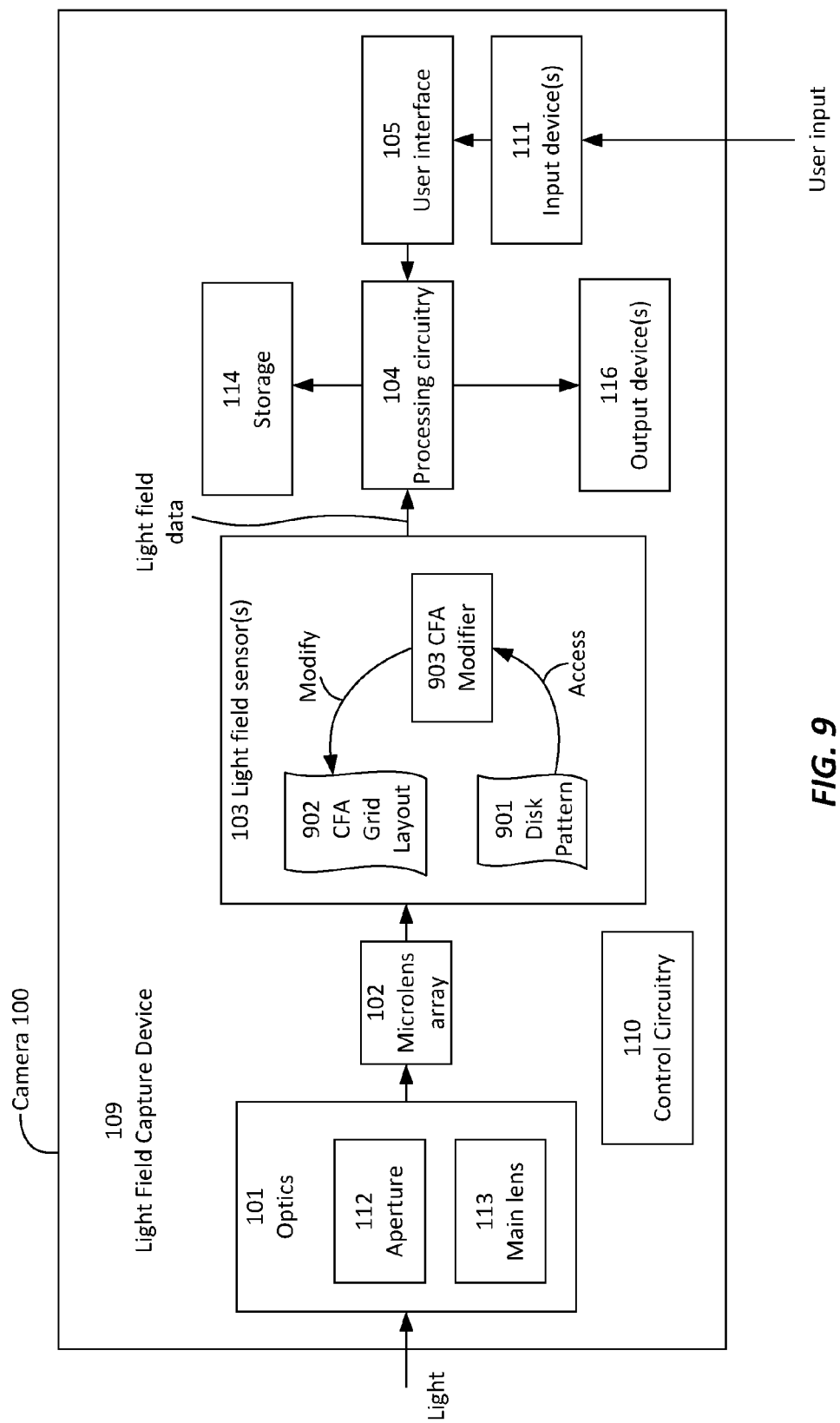
FIG. 9 depicts another example architecture of a light field capture device, according to one embodiment.

Referring now to FIG. 9, there is shown another example architecture of a light field capture device 109 according to one embodiment. As depicted in FIG. 9, light field sensors 103 include disk pattern 901 (e.g., specifying an arrangement of disks 102 in the captured light field image data formed on sensors 103), color filter array (CFA) grid layout 902, and CFA modifier 903. According to the techniques of the present invention, CFA modifier 903 can modify CFA grid layout 902 based on disk pattern 901.

Figure 10:
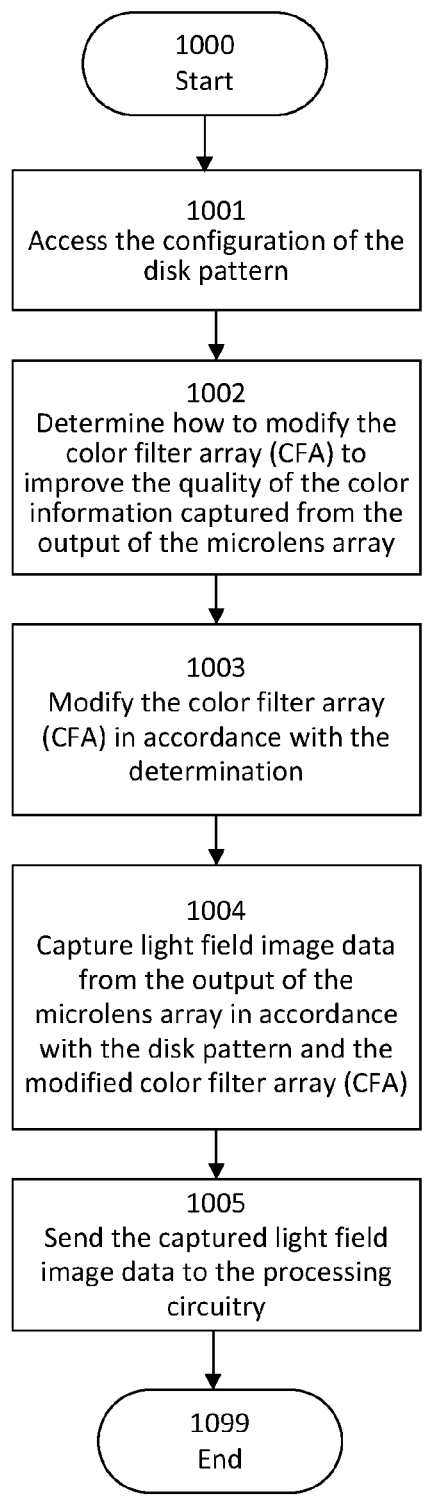
FIG. 10 is a flow diagram depicting a method for modifying a color filter array (CFA) to improve the quality of color information captured from the light field, according to one embodiment.

Referring now to FIG. 10, there is shown a flow diagram depicting a method for modifying a color filter array (CFA) to improve the quality of color information captured from the light field, according to one embodiment. For illustrative purposes, the method of FIG. 10 will be described with respect to the components and data in FIG. 9.

In at least one embodiment, CFA modifier 903 accesses 1001 the configuration of disk pattern 901. CFA modifier 903 then determines 1002 how to modify the color filter array (CFA) to improve the quality of the color information captured from the output of microlens array 102. CFA modifier 903 then modifies 1003 CFA grid layout 902 according to its determination. Then, light field sensors 103 capture 1004 light field image data from the output of microlens array 102 in accordance with disk pattern 901 and modified CFA grid layout 102. Light field sensors 103 then send 1005 the captured light field image data to processing circuitry 104.

In various embodiments, a color filter array can be modified in a variety of ways, including but not limited to: not applying a color filter to some pixels 203, varying color filter pass bands, and/or randomizing the color filter array pattern.

In various embodiments, CFA pattern modifications include, but are not limited to, the following:

Not Applying a Color Filter to Some Pixels

Pixels 203 that receive light that is strongly modulated by the microlens array 102 may have no color filter to increase the amount of photons captured by the pixels 203 during the same exposure duration. In later processing stages, the non-color-filtered pixels 203 can be used as a source of luminance signal (monochrome image) and their chrominance component can be interpolated from nearby pixels 203.

Varying Color Filter Pass Bands

Pixels 203 that receive less light can have a color filter with a wider pass band (subtractive), while pixels 203 that receive more light can have a narrower pass band. For example, pixels 203 towards the edge of the microlens image can have cyan/magenta/yellow color filter pattern while pixels 203 towards the center of the microlens image can have red/green/blue color filter pattern. This allows the edge pixels 203 to attenuate less signal in their color filter, increasing the number of photons reaching the photosensor.

Randomizing the Color Filter Array Pattern

To reduce problems that may occur due to the regularity of color filter array patterns, the color filter array arrangement can be randomized. The type of color filter over each pixel 203 can be recorded and made known to the processing software/hardware.

Varying Pixel Properties of an Image Sensor

Given a microlens array 102 positioned over an image sensor 103, different amounts of light may be captured by different pixels 203 based on their position under each microlens 201 due to various factors dependent on the sensor angular response, as well as optical characteristics of the microlens array 102 and/or main lens 113. In at least one embodiment, individual pixel properties can be adjusted based on the light field coordinates of each pixel 203 to compensate for these effects and to produce more uniform (or intentionally non-uniform) sampling.

Figure 11:
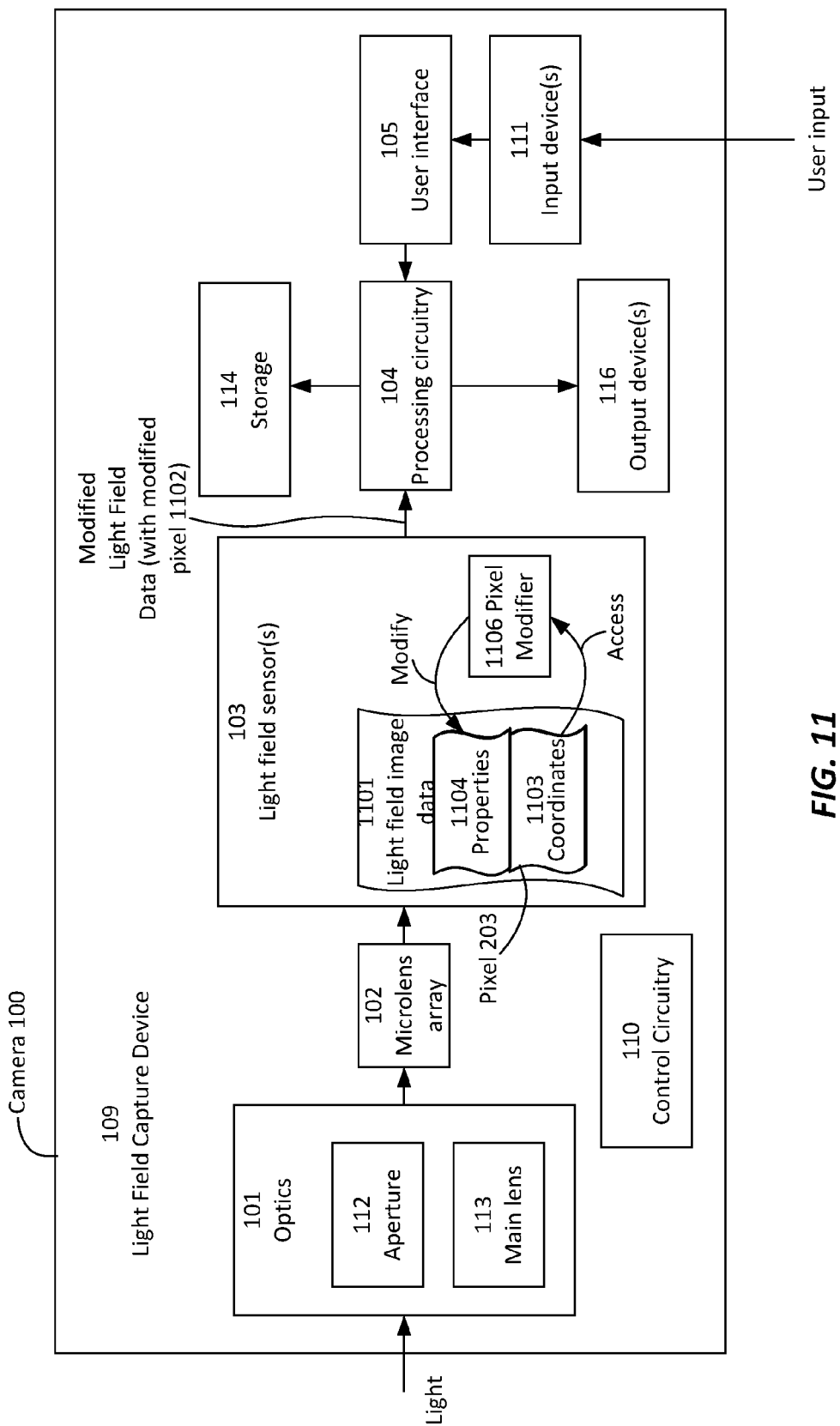
FIG. 11 depicts another example architecture of a light field capture device, according to one embodiment.

Referring now to FIG. 11, there is shown another example architecture of a light field capture device 109 according to one embodiment. As depicted in FIG. 11, light field sensors 103 include pixel modifier 1106. In general, pixel modifier 1106 can access the light field coordinates for a pixel 203 and make corresponding modifications to the pixel's 203 properties based on the pixel's 203 light field coordinates.

Figure 12:
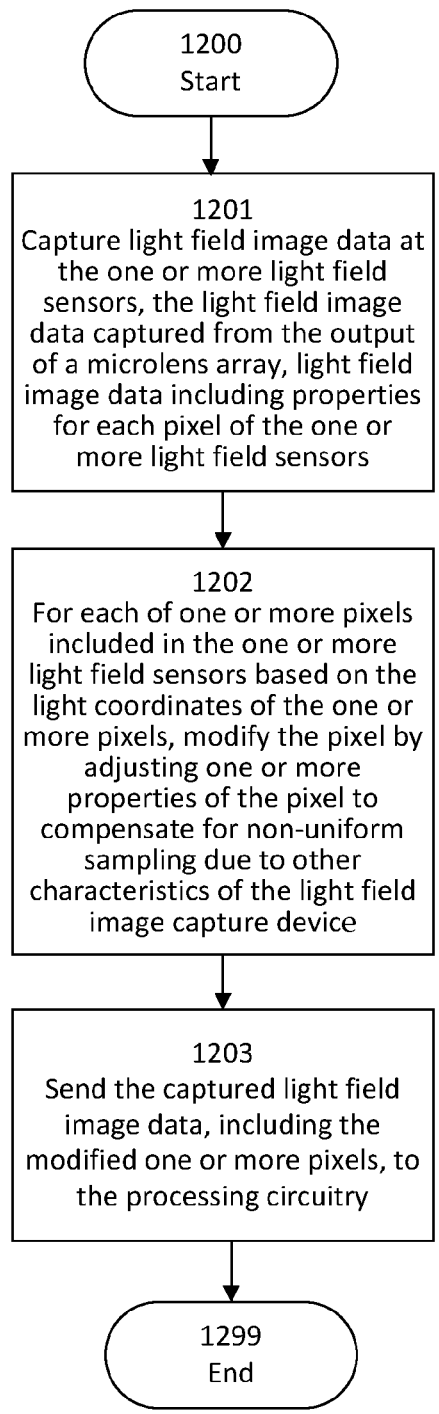
FIG. 12 is a flow diagram depicting a method for modifying pixel properties, according to one embodiment.

Referring now to FIG. 12, there is shown a flow diagram depicting a method for modifying pixel properties, according to one embodiment. The method of FIG. 12 will be described with respect to the components and data in FIG. 11.

Sensor 103 captures 1201 light field image data from the output of microlens array 102, the light field image data including properties for each pixel 203. Then, for each of one or more pixel values included in the light field image data, pixel modifier 1106 accesses coordinates 1130 for the pixel 203, and modifies 1202 the pixel 203 by adjusting one or more properties of the pixel 203 to compensate for non-uniform sampling due to other characteristics of light field capture device 109. For example, pixel modifier 1106 can modify pixel 203 by adjusting properties 1104 based on coordinates 1103. The captured light field image data, including the modified one or more pixels 203, is then sent 1203 to processing circuitry 104.

Examples of pixel properties that can be adjusted include, but are not limited to:

- Exposure duration that is unique to each pixel 203.
- Any sort of gain applied to the signal at the pixel amplifier, column amplifier, row amplifier and/or any other analog or digital amplification stage.
- Any sort of bias and/or offset applied to the signal at the photodiode, any amplifier, digital/analog converter (DAC) and/or any other processing stage.

These properties may be varied per-pixel, and/or they may be varied per group of pixels 203. For example, in at least one embodiment, there can be a fixed number of different sets of parameters, and each pixel 203 can be configured according to one of these parameter sets.

Methods for adjusting these properties include, but are not limited to:

- Any sort of post-fabrication local trimming of the semiconductor.
- Implementing (for example, in hardware) settable per-pixel or per-pixel-group exposure scale or offset, signal gain, signal bias or signal offset that is provided as a digital or analog signal prior to image exposure.
- Implementing (for example, in hardware) settable per-pixel or per-pixel-group exposure scale or offset, signal gain, signal bias or signal offset that is stored in semiconductor fuses during manufacture time.
- Implementing (for example, in hardware) per-pixel or per-pixel-group signal gain, signal bias or signal offset that is provided synchronously during image read-out as a digital or analog signal.

Moving/Jittering Pixels and/or Microlenses

As described above, in at least one embodiment, pixels 203 on sensor 103 may be arranged in a regular pattern, such as a square pattern. Likewise, lenses 201 on microlens array 102 may also be arranged in a regular pattern, such as a square pattern or a hexagonal pattern. There may be advantages, however, to perturbing either or both of these regular patterns such that small, random variations in position are introduced. Such random variations in position are referred to herein as "jitter"; the introduction of jitter is referred to herein as "jittering". It is well known in the field of computer graphics that jittering sample locations converts aliasing to noise. See, for example, Cook, Robert L., *Stochastic Sampling in Computer Graphics*, ACM Trans. Graph. 5, 1 (1986). Because the positions of microlenses 201 and pixels 203 essentially determine the sample pattern of the light field entering camera 100, these advantages may also accrue to light field sampling. A related advantage is that the regularity of sample patterns in re-projections of the light field may also be reduced. There may be additional advantages as well.

Figure 13:
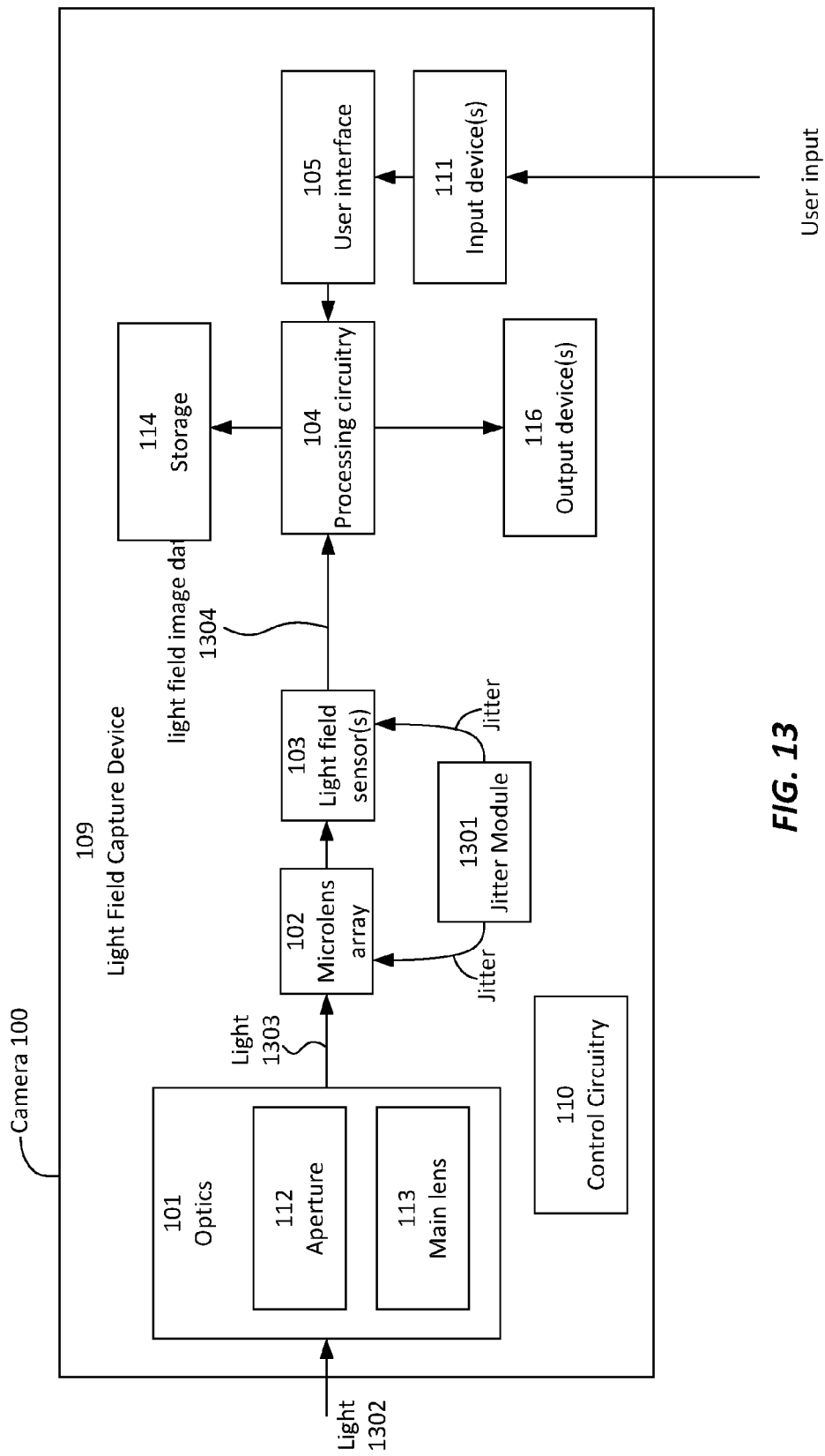
FIG. 13 depicts another example architecture of a light field capture device, according to one embodiment.

Referring now to FIG. 13, there is shown another example architecture of a light field capture device 109 according to one embodiment. As depicted in FIG. 13, light field capture device 109 includes jitter module 1301. Jitter module 1301 is configured to introduce jitter into microlens array 102 and/or light field sensor(s) 103.

Figure 14:
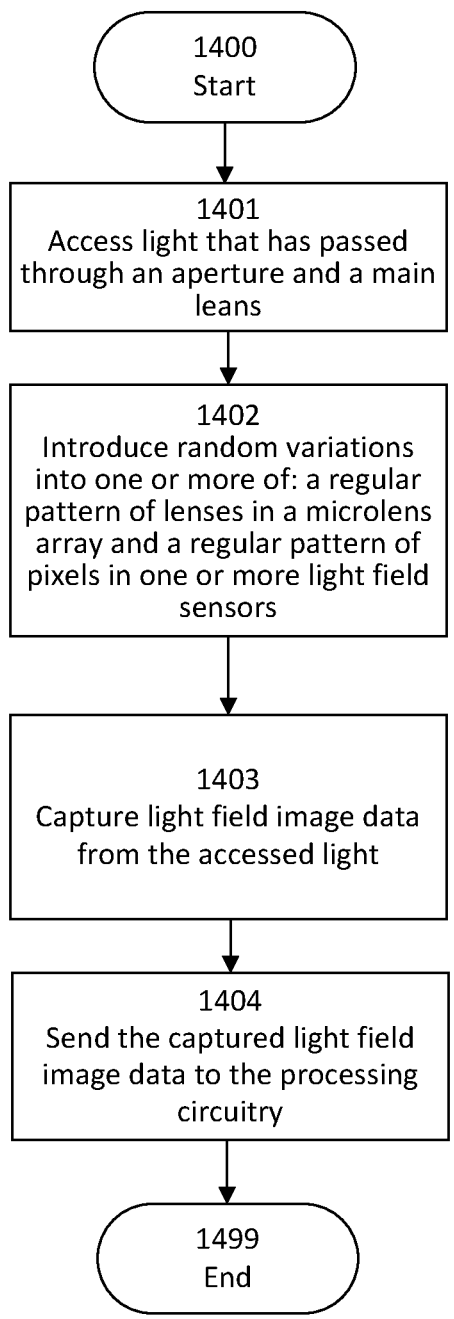
FIG. 14 is a flow diagram depicting a method for introducing jitter into optical system components, according to one embodiment.

Referring now to FIG. 14, there is shown a flow diagram depicting a method for introducing jitter into optical system components, according to one embodiment. The method of FIG. 14 will be described with respect to the components and data in FIG. 13.

In at least one embodiment, light that 1303 has passed through aperture 112 and main lens 113 is accessed. As depicted in FIG. 13, light 1302 passes into camera 100 and light 1303 passes out of optics 101. Jitter module 1301 introduces 1402 random variations, for example by changing positions of lenses 201 in microlens array 102 and/or pixels 203 in one or more light field sensors 103.

Subsequent to introduction of the random variations, light field image data 1304 is captured 1403 from the accessed light 1303, for example by microlens array 102 and light field sensor(s) 103. The captured light field image data 1304 is sent 1404 to processing circuitry 104.

Jitter patterns may be random at any scale. At one extreme, the pattern may extend throughout the range, i.e., across the entire microlens array 102 or the entire sensor 103. At the other extreme, the pattern may be a small tile that is repeated across microlens array 102 or sensor 103. Between these extremes lie larger tiles, and random patterns of larger tiles. The motivation for tiling may be reduced processing cost, because the tables required to correctly interpret sample locations are smaller. Much of the advantage of jittered sampling may accrue with fairly small tiles. For example, the same pattern of pixel jitter might be implemented for the tens of pixels 203 in each disk.

In at least one embodiment, pixels 203 on sensor 103 can have their true locations jittered. Alternatively, pixels 203 can be placed on a regular grid, but made to appear jittered by making adjustments to lenses that are placed on each pixel location. (These lenses are intended to guide light impinging on sensor 103 toward the light-sensitive part of the electronic pixel structure.) Adjusting only the optics on the surface of sensor 103, rather than making changes to sensor 103 itself, can be less expensive, and can be implemented with a larger tiling. Pixel jitter can be performed in conjunction with variation in pixel size, which can also be introduced either directly in sensor 103, or by making changes to the optics on the surface of sensor 103.

In at least one embodiment, jittering the microlens positions and/or the pixel locations is performed in such a manner as to ensure that no two lenses are positioned closer than the diameter of the disks. Thus, disk overlap is avoided, which otherwise can cause pixel values to not be correctly interpreted. The closeness constraint may be satisfied with random jittering. Alternatively it may be more efficient to satisfy the closeness constraint as additional constraint on the positions of the microlenses. For example, an annealing algorithm may allow both near-random jitter and a minimal-distance constraint to be implemented simultaneously. In particular, jitter can be randomly introduced throughout the tile, and then in cases where the minimum-distance constraint is violated, samples can be re-jittered; this process can be repeated until constraints are satisfied.

Designing for Integer-Pitch Disk Images

In at least one embodiment, modifications can be made to microlens array 102 and main lens 113 design and placement within the optical system 101, so as to produce disk images with vertical and/or horizontal pitches of integer numbers of sensor pixels 203, where the integer pitch is chosen to enable processing approaches that are cheaper, faster, and/or higher quality. Such approaches include (but are not limited to) those described below.

The pitch of the disk image on sensor 103 is governed by the pitch of microlens array 102, its separation from sensor 103, and the distance to main lens 113 exit pupil. Choosing these parameters appropriately, and also ensuring that microlens array 102 is not spatially rotated with respect to sensor 103, allows light field disk images to be captured in which the disk pitch in either or both of the horizontal and vertical directions is an integer.

In addition to the disk pitch being an integer value, another design constraint that can be applied is to ensure that microlens array 102 is properly aligned on top of sensor 103 such that each row of microlenses 201 in microlens array 102 is parallel to the rows of sensor pixels 203. This is possible using wafer-to-wafer manufacturing techniques, in addition to lithographic manufacturing approaches.

For example, referring again to FIGS. 1A, 1B, 2, and 7, main lens 113 and microlens array 102 can be arranged to produce disk images 201 (or center rectangles 601) with vertical and/or horizontal pitches of integer numbers of sensor pixels 203 on sensor(s) 103. Alternatively or in combination, the separation between microlens array 102 and sensor(s) 103 can be selected to facilitate vertical and/or horizontal pitches of integer numbers of sensor pixels 203 on sensor(s) 103. Alternatively or in combination, microlens array 102 can be configured to ensure that it is not spatially rotated with respect to sensor(s) 103. Alternatively or in combination, microlens array 102 can be configured to ensure that it is properly aligned on sensor(s) 103 such that each row of microlenses 201 in microlens array 102 is parallel to a row of sensor pixels 203 in sensor 103.

In at least one embodiment, main lens 113 is a moving main lens. Main lens 113 can be of a design that ensures the disk image pitch on sensor(s) 103 remains constant and an integer as main lens 113 moves (e.g., as it zooms). For example, main lens 113 may have an exit pupil sufficiently far away from the sensor surface of light field sensor(s) 103 (relative to the sensor dimensions) for all focal lengths.

Transposition to an Array of Sub-Aperture Images

In at least one embodiment, the optical system is configured so that the captured light field disk images 201 have integer-pitch disks on a square lattice, with each disk image 201 being contained within a square N×N region of source pixels 203. Further, the light field image data is transposed from its "array of disks" representation into its equivalent "array of sub-aperture images" representation, as described in Ng et al. Such transposition may occur in any of the following places, or at any other suitable location:

- On sensor 103 itself, so that the raw light field image data that is read out from sensor 103 is already in its transposed layout.
- On a processing element connected to sensor 103, such as a camera system-on-chip (SoC), within the camera processing flow.
- On light field image data that has been saved into a file.

The transposition of the data may be done in either the raw domain (i.e., prior to demosaicing the data), or on the light field image data after it has been converted to full color (e.g., in the RGB or YUV domains).

Light field image data that is represented in this layout may have much less high-frequency modulation. The benefits of arranging the light field image data in this layout may include, for example:

- Increased ability to process the light field image data as if it were a 2D image, for example demosaicing it (in the case of raw light field image data), JPEG-encoding it, video-encoding a sequence of such frames, and the like. This is due to the fact that the light field image data, encoded in this format, appears to be just an atlas of 2D images. When represented as an "array of disks", the light field image data contains a high-frequency modulation pattern due to the disk pattern that often results in the data being degraded if a standard 2D image algorithm is applied to the data.
- Ability to perform light field processing of the data more cheaply, efficiently, or quickly.

Figure 15:
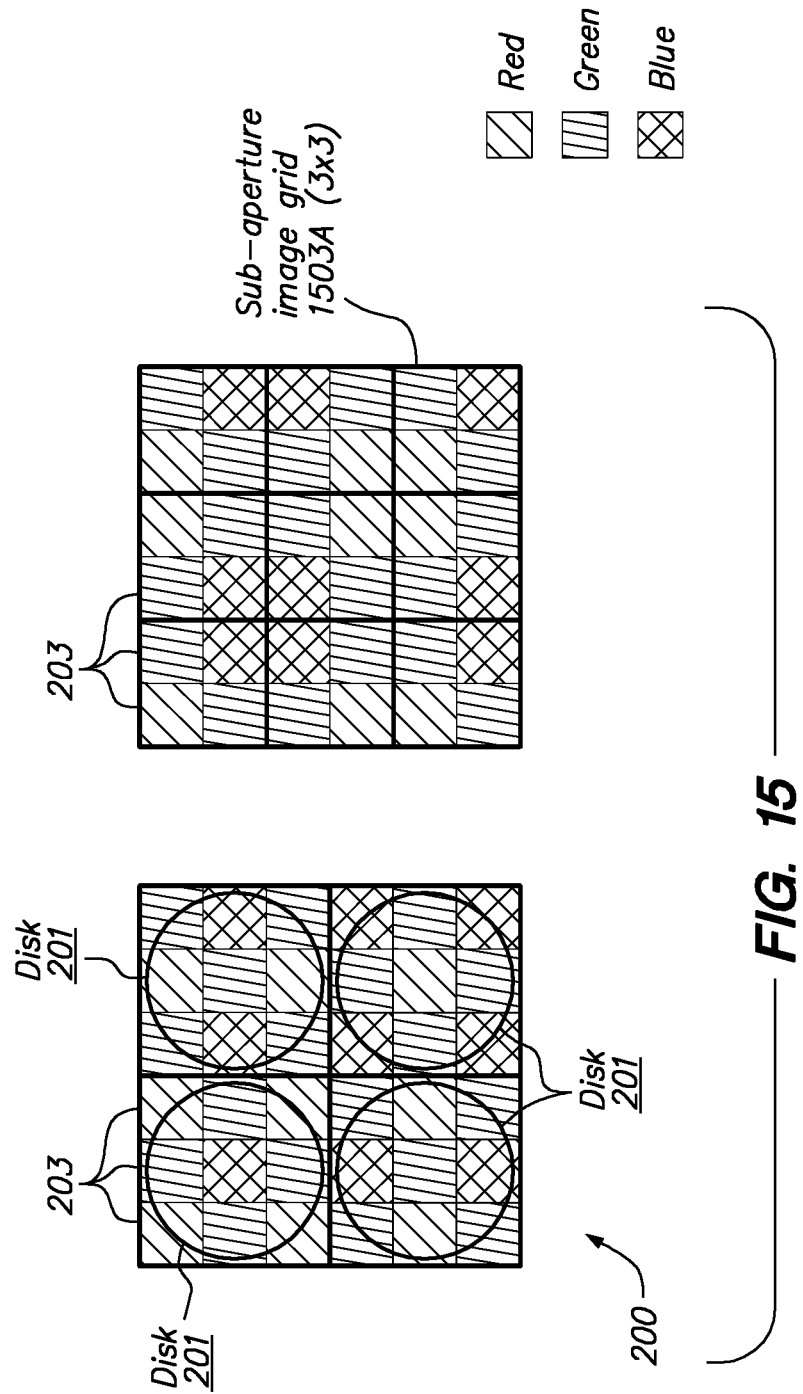
FIGS. 15 and 16 are examples of transposing light field data, according to one embodiment.

In the case of performing such a transposition on raw light field image data that was captured using a sensor with a Color Filter Array (CFA) (e.g., a Bayer sensor), the light field image data post-transposition may no longer contain a uniform color pattern across the extent of the data. For example, as depicted in FIG. 15, given light field image 200 which has 2×2 disks 201, with each disk 201 being 3×3 pixels (N=3), this could be transposed into sub-aperture image grid 1503A with 3×3 sub-aperture images, each image having 2×2 pixels 203.

Figure 16:
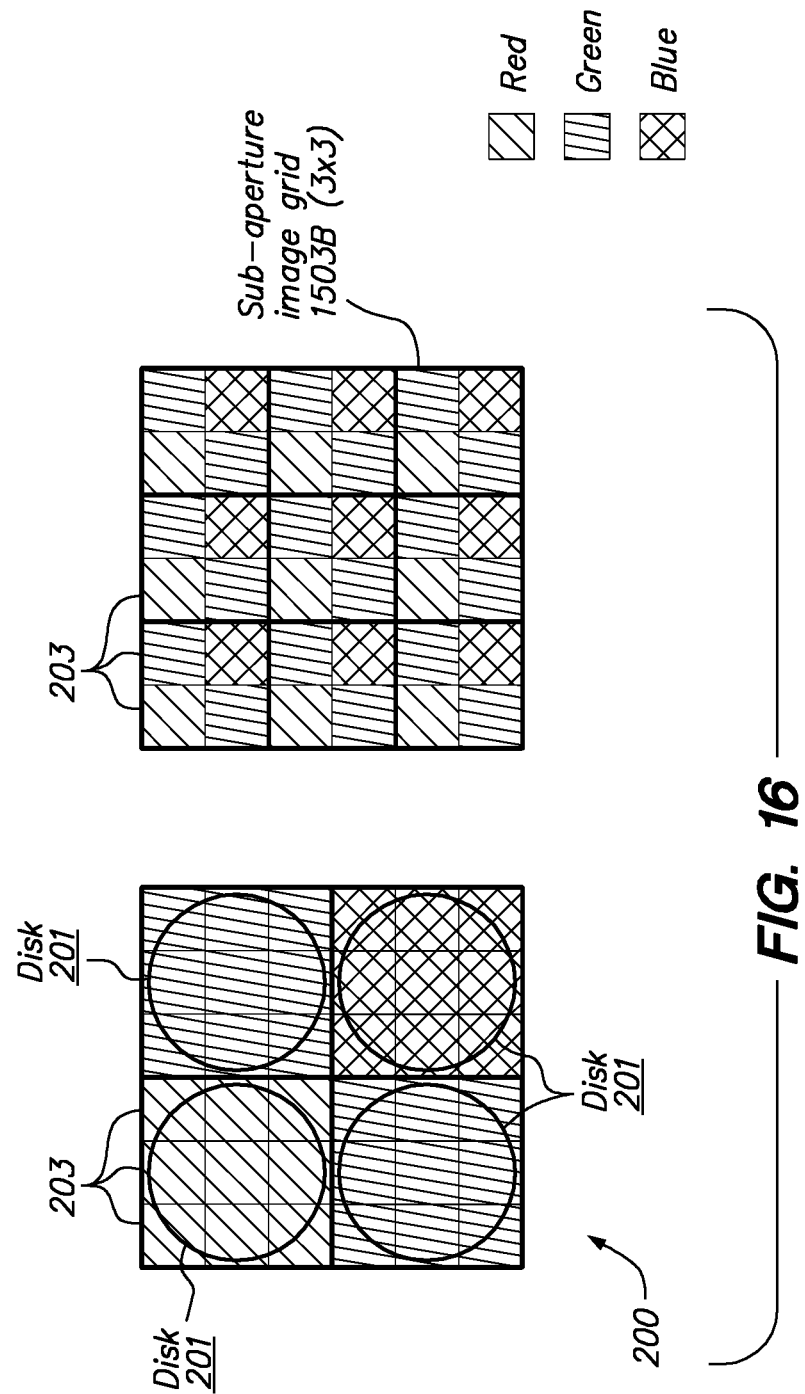

In another embodiment, as depicted in FIG. 16, the CFA pattern can be modified on the sensor such that the light field image data, post-transposition, is a legitimate example of a raw CFA pattern, such as a Bayer mosaic pattern. One way to implement this on light field image 200 is to use a CFA that causes each disk image 201 to be a uniform color, with the color pattern of disks in the disk image being a legal mosaic pattern. This can be transposed into sub-aperture image grid 1503B with 3×3 sub-aperture images, each of 2×2 pixels.

Raw Transposition for High-Resolution Refocusing to a Specific Depth

In at least one embodiment, an optical system is implemented that results in captured light field images with an integer disk pitch that allows for a fast reordering of the captured light field image data in the raw Bayer domain such that the resultant reordered light field image data may be directly interpreted as a 2D image that is focused at a specific depth and processed using standard 2D image processing algorithms (including demosaicing) to yield a final image that can be displayed or output.

In at least one embodiment, the optical system may be characterized as follows.

- Microlens array (MLA) 102 with square packing, integer N, and proper alignment.
- Optical system for video and/or live view set up in order to enable viewing of a particular focal plane (in a fixed focus camera, this focal plane may be near the infinity focal plane) as follows:
  - Consider the set of all sub-aperture images, corresponding to a set of positions within the virtual aperture of main lens 113, where the sub-aperture images are viewed at "MLA resolution" in that the number of pixels 203 across a row in a sub-aperture image is approximately the same as the number of microlenses 201 across a row of the microlens array 102.

Define L such that scene objects which are in focus in the particular focal plane will be in focus in an output image which is formed by the "shift-and-add" method of refocusing described in Ng et al. when the extreme sub-aperture images corresponding to the points around the perimeter of the virtual aperture are each shifted by L/2 pixels. The direction of the shift is determined by whether the particular focal plane under consideration is "in front of" or "behind" the optically captured focal plane (see Ng et al.).

In operation, camera 100 refocuses to the focal plane characterized as above by the parameter L according to the method described below.

N and L are selected such that N/L is integral. Let P=N/L.

The sensor has a read-out mode that can read a single block of P×P pixels, repeating every N×N pixels.

Microlens array 102 is aligned with sensor 103 such that each P×P read-out block is near the center of the disk 201 of the pixel 203 corresponding to the microlens array 102.

Figure 17A:
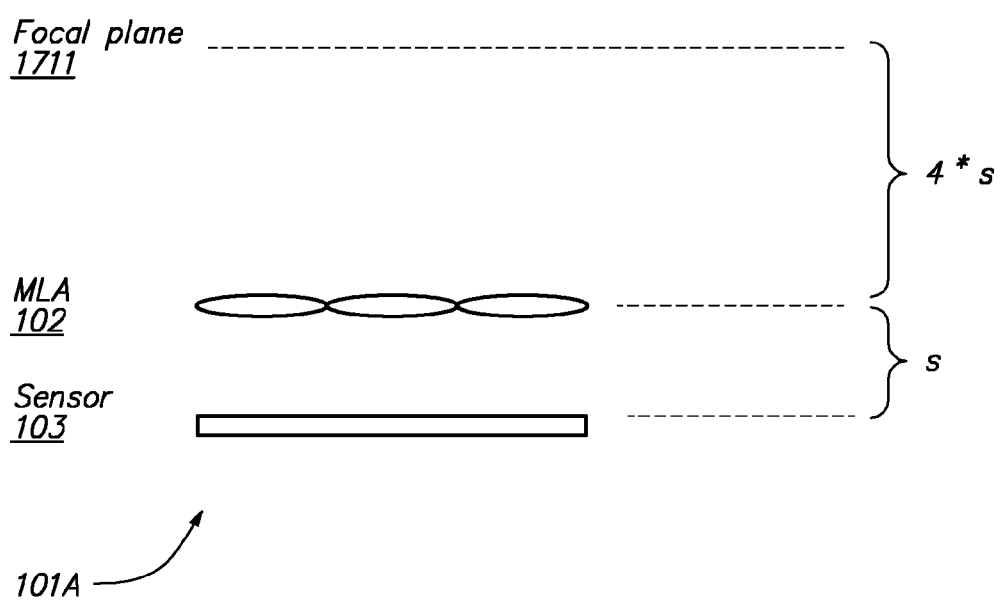
FIG. 17A is an example of an optical system.
Figure 17B:
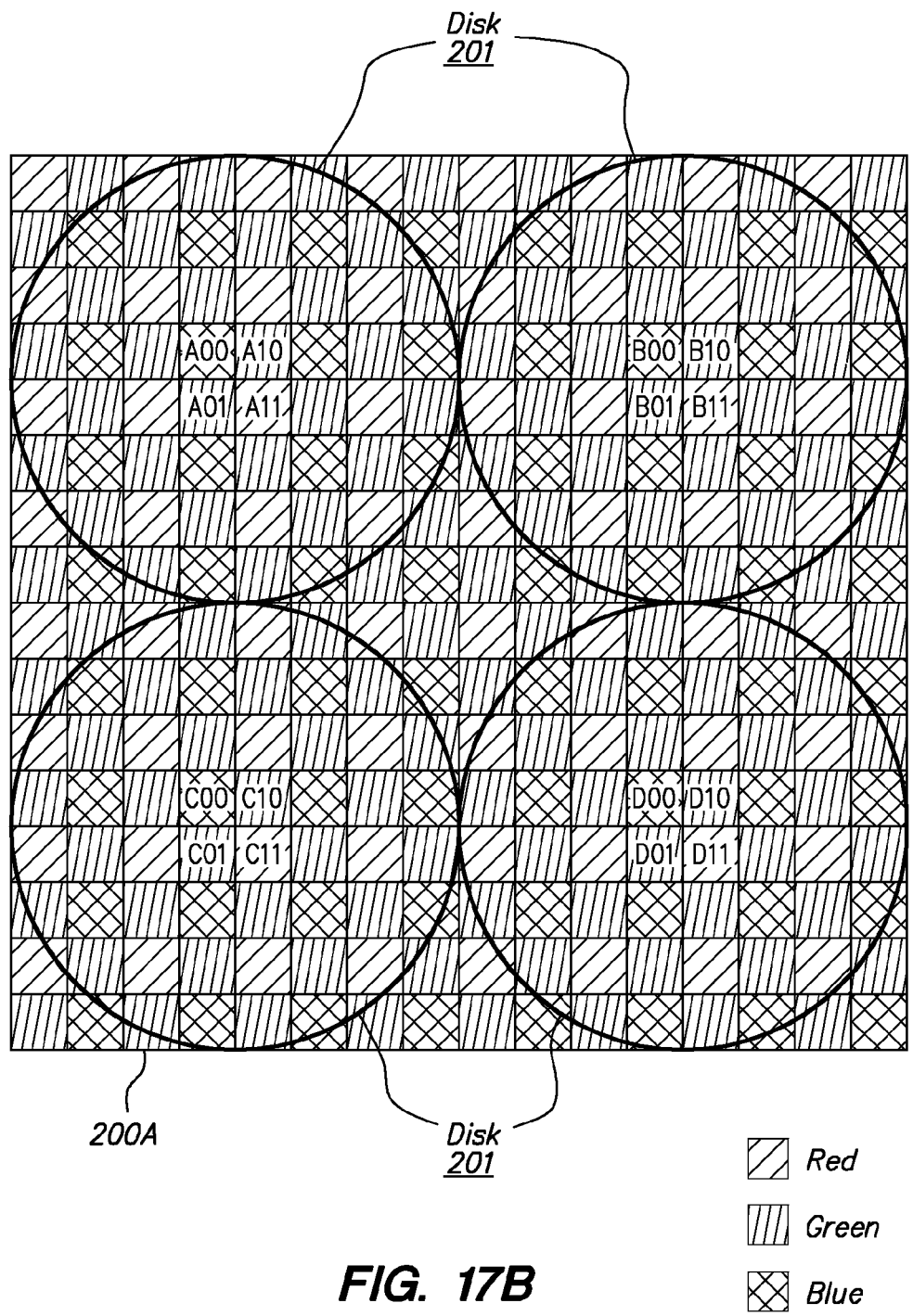
FIG. 17B is an example of a light field image having disks.
Figure 17C:
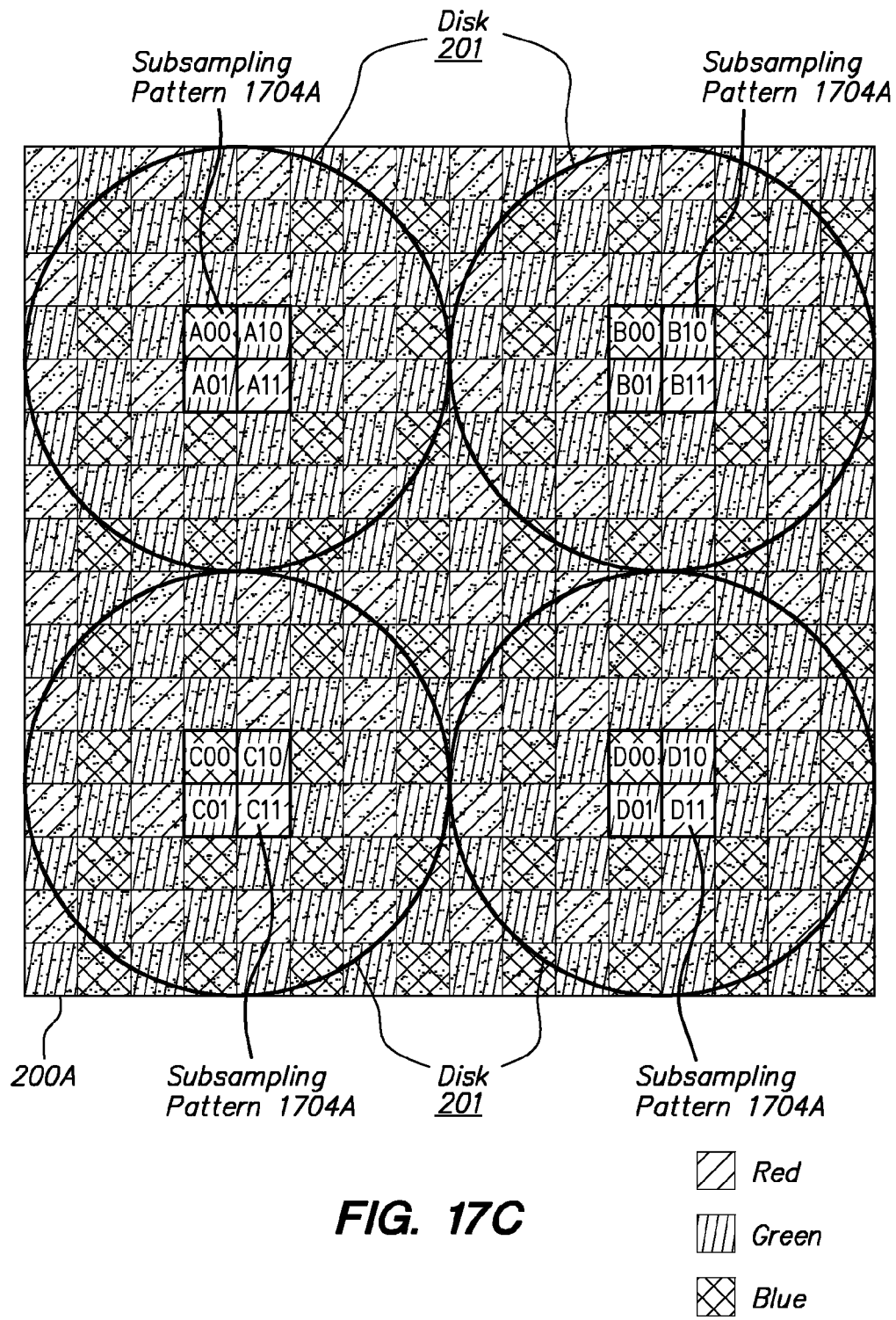
FIG. 17C is an example of a sub-sampling pattern for a light field image.
Figure 17D:
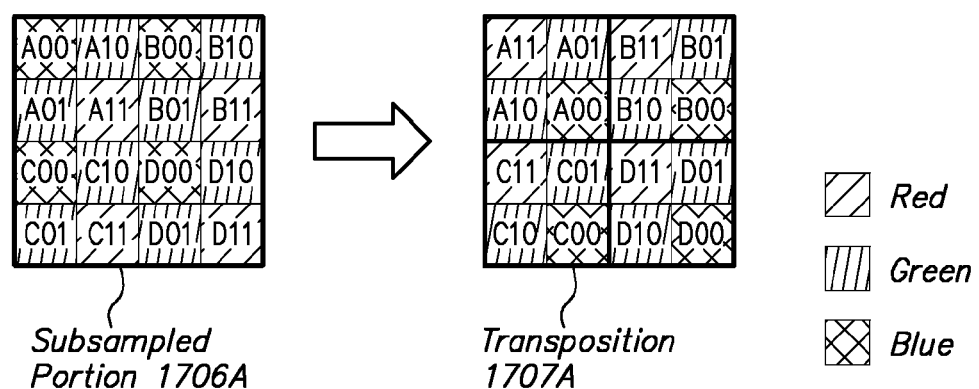
FIG. 17D is an example of transposing a subsampled portion of a light field image.

Referring now to FIGS. 17A through 17D, there is shown an example sensor 103 having a read-out mode that can read a single block of P×P pixels 203, repeating every N×N pixels 203. FIG. 17A depicts an optical system 101A with focal plane 1711, microlens array 102, and sensor 103. In FIG. 17A, the distance between focal plane 1711 and microlens array 102 is four times the distance between microlens array 102 and sensor 103 (i.e., L=4). FIG. 17B depicts light field image 200A having 2×2 disks 201, with each disk 201 being 8×8 pixels (N=8). Light field image 200A can be generated by the components of optical system 101A. FIG. 17C depicts subsampling pattern 1704A of light field image 200A. FIG. 17D depicts a subsampled portion 1706A of light field image 200A taken using subsampling pattern 1704A and corresponding transposition 1707A for L=N/2. Within transposition 1707A projection, Bayer mosaic pixels 203 are adjacent to both X/Y and U/V neighbors for demosaicing.

Figure 18A:
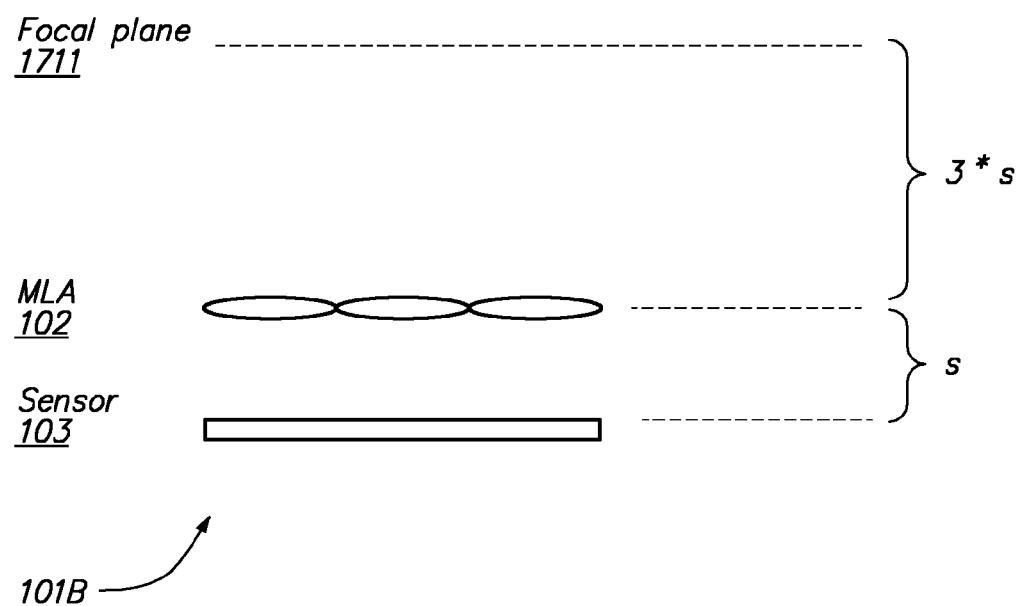
FIG. 18A is an example of an optical system.
Figure 18B:
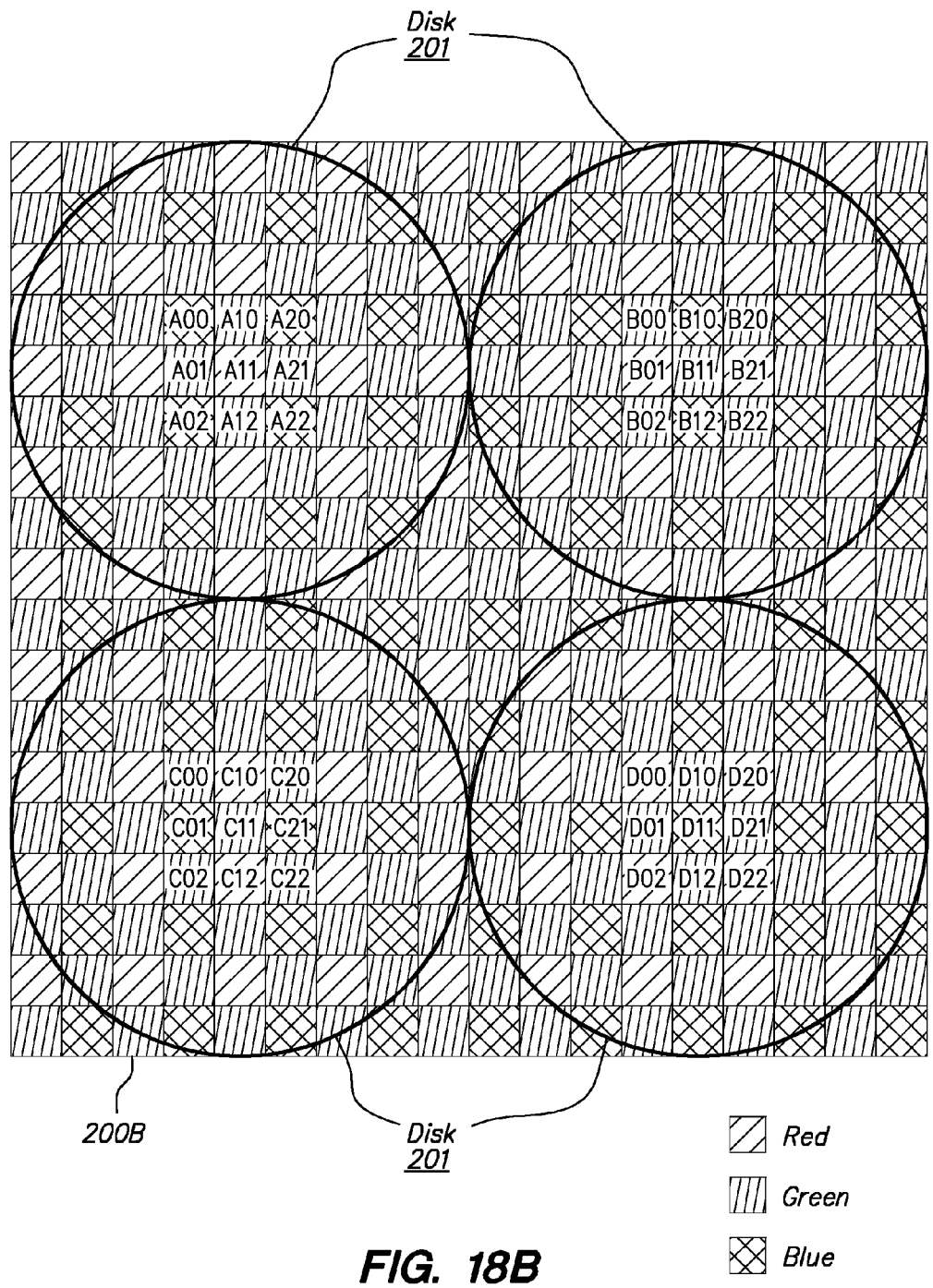
FIG. 18B is an example of a light field image having disks.
Figure 18C:
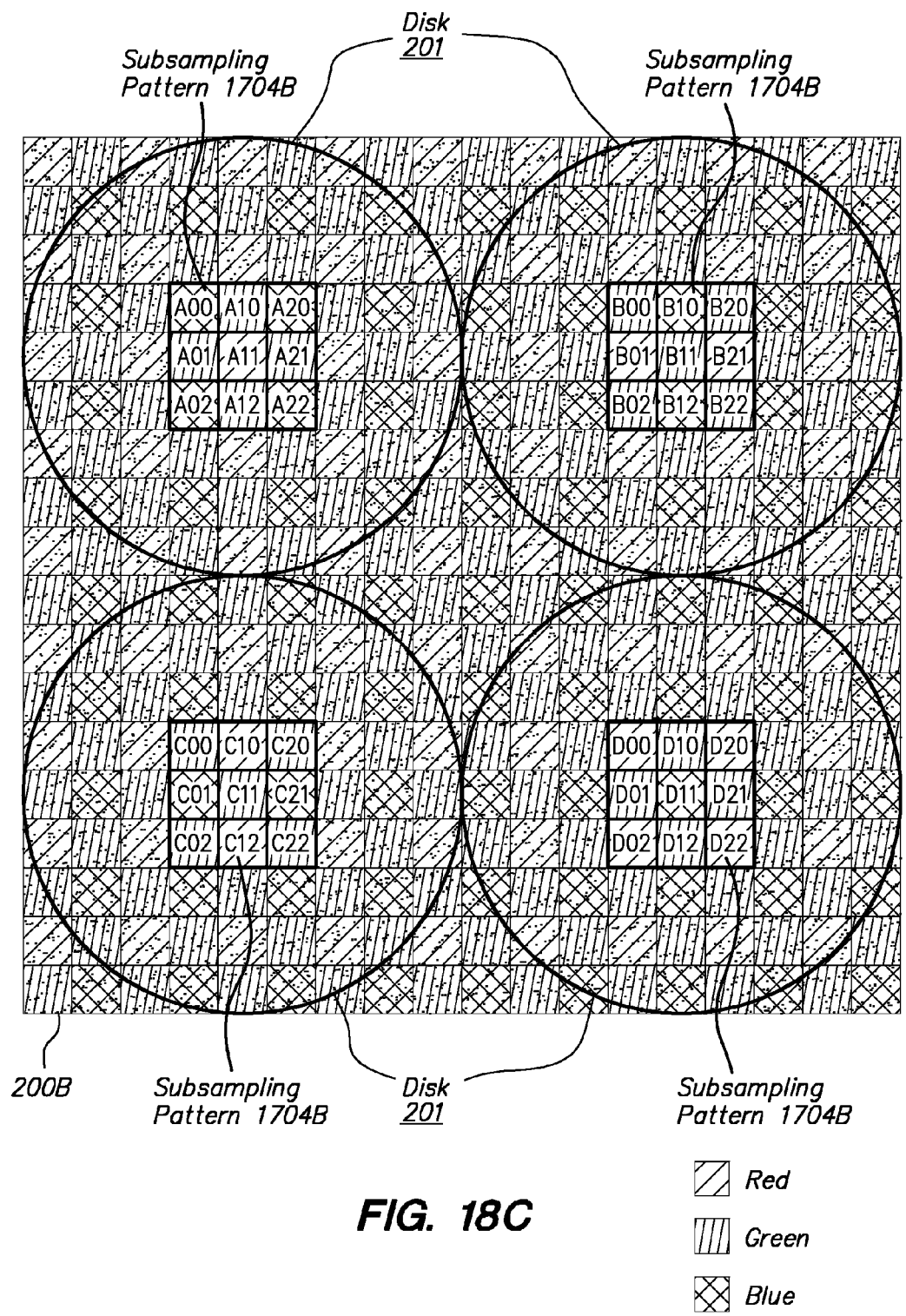
FIG. 18C is an example of a sub-sampling pattern for a light field image.
Figure 18D:
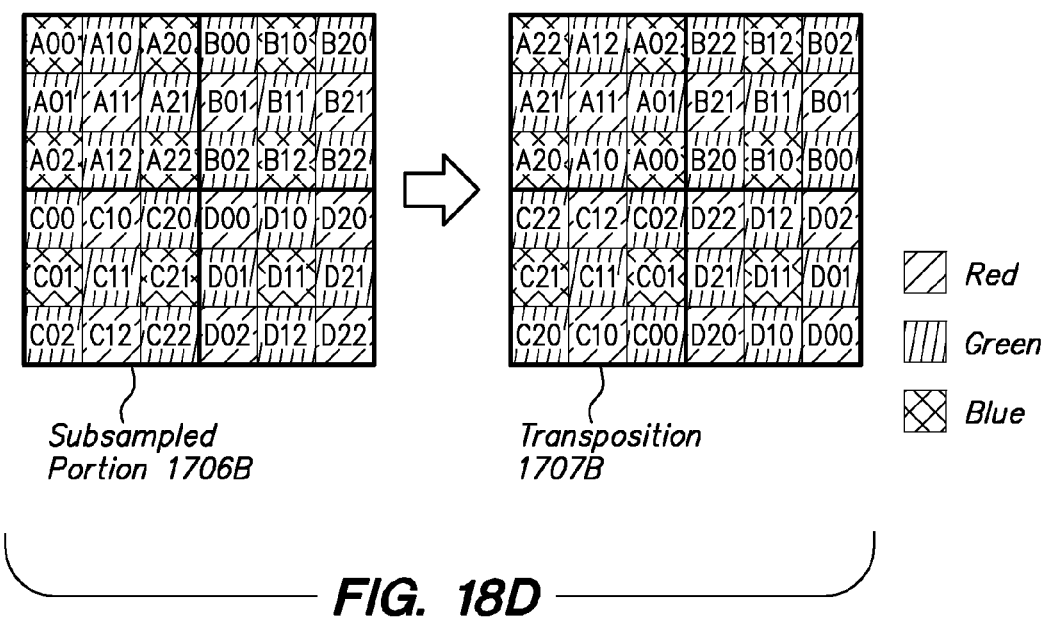
FIG. 18D is an example of transposing a subsampled portion of a light field image.

Referring now to FIGS. 18A through 18D, there is shown another example sensor 103 having a read-out mode that can read a single block of P×P pixels 203, repeating every N×N pixels 203. FIG. 18A depicts an optical system 101B with focal plane 1711, microlens array 102, and sensor 103. In FIG. 18A, the distance between focal plane 1711 and microlens array 102 is three times the distance between microlens array 102 and sensor 103 (i.e., L=3). FIG. 18B depicts light field image 200B having 2×2 disks 201, with each disk 201 being 9×9 pixels (N=9). Light field image 200B can be generated by the components of optical system 101B. FIG. 18C depicts subsampling pattern 1704B of light field image 200B. FIG. 18D depicts a subsampled portion 1706B of light field image 200B taken using subsampling pattern 1704B and corresponding transposition 1707B for L=N/3. Within transposition 1707B projection, Bayer mosaic pixels 203 are adjacent to both X/Y and U/V neighbors for demosaicing.

In operation, camera 100 subsamples the image from the P×P blocks and assembles the resulting image. In the case that L is positive (in the background), the pixels 203 within each P×P block are flipped across the center point (FIG. 18D). In the case that L is negative, the pixels 203 remain in place.

In at least one embodiment, the resulting image has the following properties:

It is focused at the focal plane characterized by the parameter L.

The resulting image is SensorWidth*P/N pixels wide and SensorHeight*P/N pixels high. In the case of a 4000×3000 sensor (12 MP), N=10 and L=5, the output image is 800×600 pixels.

Each pixel 203 in the resulting Bayer image is adjacent to both its neighbors in X/Y and U/V.

The depth of field is P times the optical system, in effect creating an image with a somewhat extended depth of field.

One advantage of this approach is that it can create extended depth-of-field (EDOF) video and live-view in a highly efficient manner. The projection in the Bayer mosaic allows for a demosaicing with true neighbors in the X,Y,U,V space. The method also results in relatively high resolution output.

Integer-Pitch Hexagonal Microlens Array Layouts

In at least one embodiment, a light field optical system includes a microlens array 102 on which microlenses 201 are laid out in a non-rectangular lattice, such as, for example, a hexagonal lattice, where the lattice may be stretched in one dimension (e.g., vertically or horizontally) to achieve an integer pitch in each dimension. For example, with a microlens array 102 with a hexagonal layout, the microlens pitch may be chosen to result in a horizontal disk pitch on the sensor of N=10 pixels, but in this case, the vertical disk pitch will be N*SQRT(3)/2=8.66 pixels. Stretching the microlens array layout vertically by 4% would result in a vertical pitch of 9.

Positioning and/or Orienting Microlens Array 102 on Top of Sensor 103 Based on Available Read-Out Modes of Sensor 103

In at least one embodiment, the position and orientation of microlens array 102 above sensor 103 can be determined based on the read-out modes of sensor 103. Given a microlens array 102 and an image sensor 103, an optimal orientation and position of microlens array 102 over image sensor 103 can be determined. In at least one embodiment, this orientation and position are then applied to microlens array 102 during the manufacturing process before microlens array 102 is fixed in place.

Figure 19:
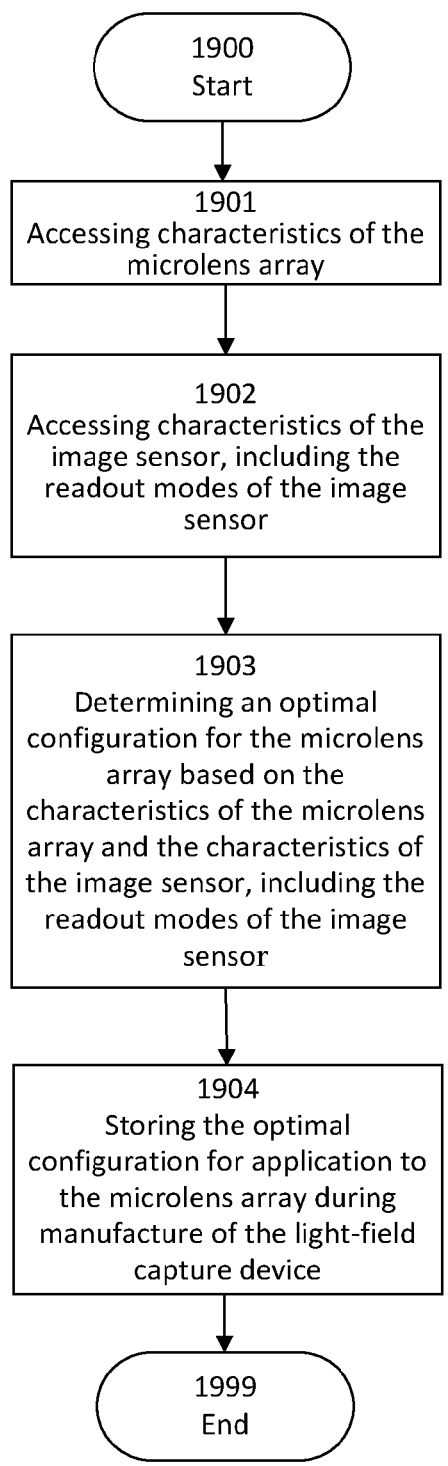
FIG. 19 is a flow diagram depicting a method for determining and configuring a microlens array for use in a light field image capture device, according to one embodiment.

Referring now to FIG. 19, there is shown a flow diagram depicting a method for determining and configuring a microlens array 102 for use in a light field image capture device 109, according to one embodiment. This method will be described with respect to the components of FIGS. 1A, 1B, and 5.

First, characteristics of microlens array 102 are accessed 1901. Then, characteristics of sensor(s) 103, including the read-out modes of sensor(s) 103, are accessed 1902. An optimal configuration for microlens array 102 is determined 1903 based on the characteristics of microlens array 102 and the characteristics of sensor(s) 103, including the read-out modes of image sensor(s) 103. The optimal configuration for is stored 1904 in a storage device, for application to microlens array 102 during manufacture of light field capture device 109. The optimal configuration can be stored, for example, in manufacturing equipment used to manufacture camera 100.

In at least one embodiment, the system considers a set of (potentially all) physical rotations of microlens array 102 about the axis orthogonal to the image sensor plane (Z-axis) and all physical translations of microlens array 102 in the plane parallel to the image sensor plane (XY-axis). Also, the system considers the set of all read-out modes of sensor 103 (including, for example, binning, skipping, resampling, scaling, and/or some combination thereof.). For each sensor read-out mode, two different orientation/positions of the microlens array 102 can be compared by computing and considering the following factors:

- The ratio of the average modulation of the read-out pixels 203 to the average modulation of all pixels 203. For example, suppose the read-out mode skips pixels 203 according to a periodic pattern of size N both vertically and horizontally. A translation of microlens array 102 that maximizes the number of read-out pixels 203 that are in areas with minimal modulation would be preferable to one that does not.
- Which section of the light field is captured by the read-out mode if it is a reduced resolution read-out mode. The set of samples in each read-out frame can be interpreted with respect to their light field coordinates. The shape of this sample distribution for a given mode will change with translation and rotation of microlens array 102, and some distributions will be better than others. For example, suppose the read-out mode skips pixels 203 according to a periodic pattern of size N both vertically and horizontally, and each light field disk image happens to contained within an N×N pixel square on sensor 103. A translation and rotation of microlens array 102 that makes sure the center pixel 203 is read out under each microlens 102 would produce the center sub-aperture image. See, for example, Ng et al.
- Which parts of the light field are mixed together during any scaling, binning, and/or resampling applied by image sensor 103 in the given read-out mode. Each output pixel in a scaled, binned, or sub-sampled version of a light field image may be computed as a combination of sensor pixels 203 (which may be a weighted average). One criterion which may be applied to evaluate a particular microlens array placement is the spread of directional information in the light field coordinates of the set of sensor pixels 203 which were used to compute the output pixel. Choosing a placement which results in a larger average spread of directional coordinates in each output pixel may result in fewer aliasing artifacts in the output image.

MLA Designs to Deal with Large Chief-Ray Angle (CRA)

The performance of a sensor 103 intended for use with a telecentric lens for as a main lens 113 can be (potentially dramatically) improved by tilting microlenses 201 towards the optical axis of main lens 113, so that microlenses 201 receive rays of light perpendicular (or more nearly perpendicular) to their own local surfaces. For example, referring to FIG. 1B, the lenses in microlens array 102 can be tilted towards the optical access of main lens 113.

Figure 20:
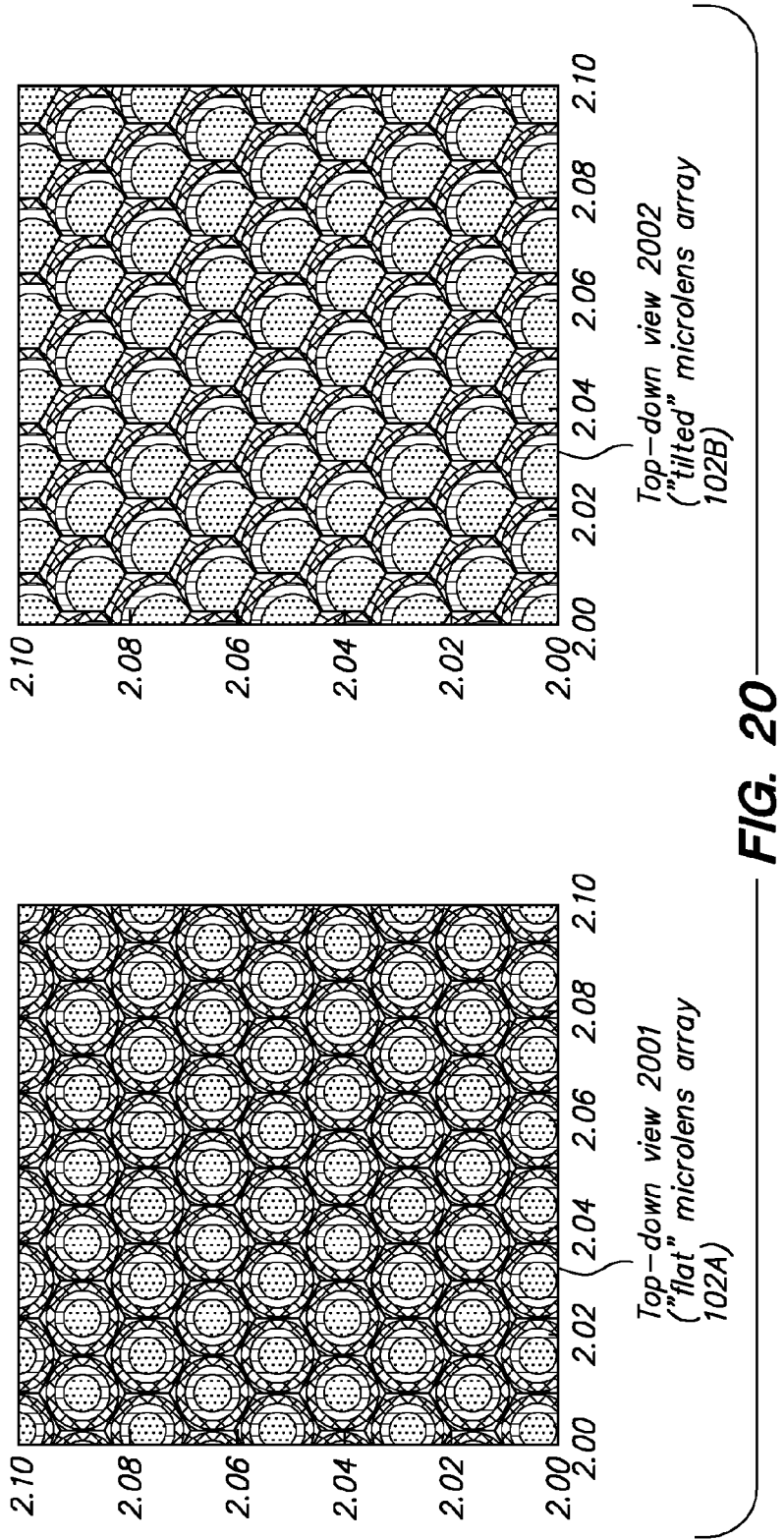
FIG. 20 depicts top-down views of two example microlens arrays.
Figure 21:
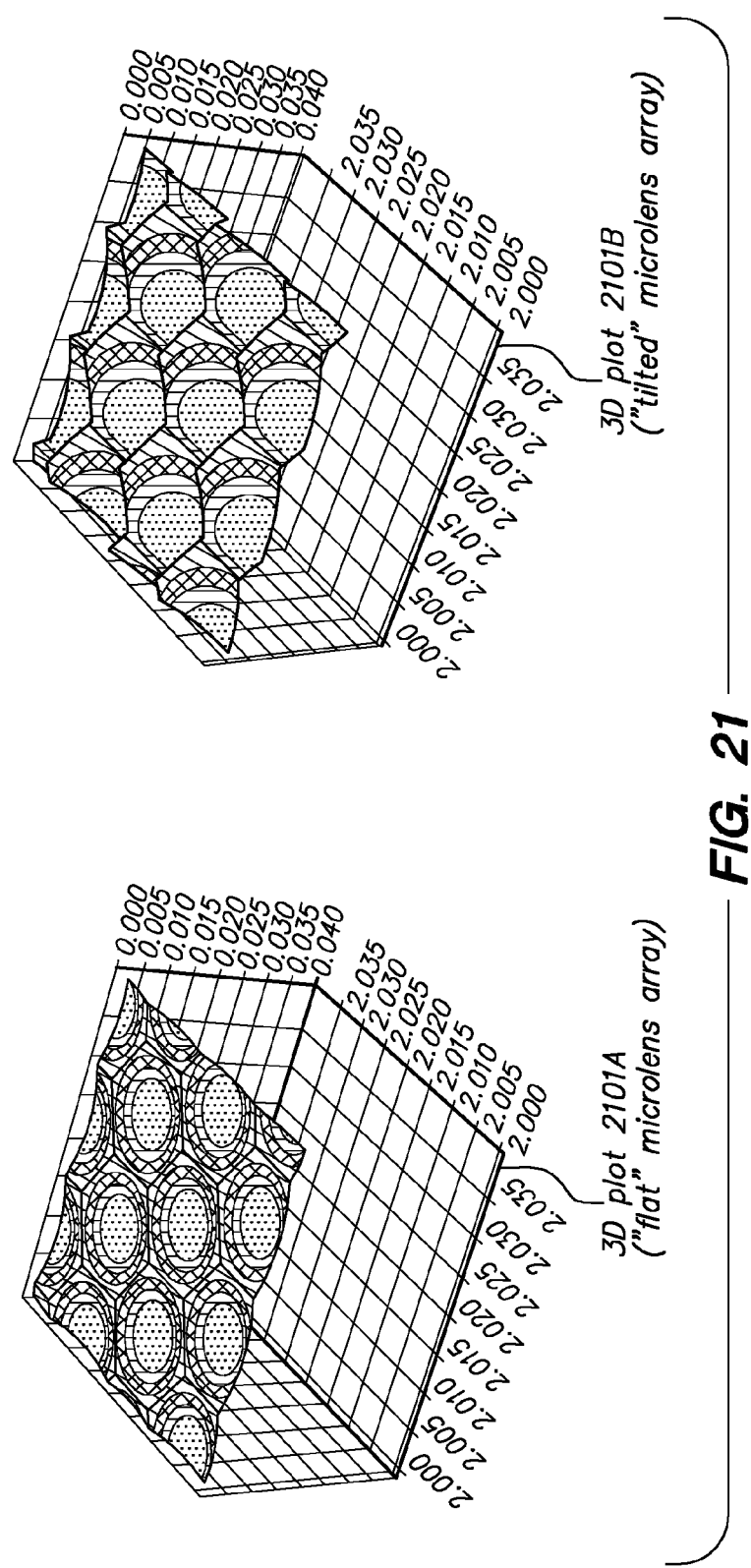
FIG. 21 is an example 3D plot of the surfaces in FIG. 20.

Referring now to FIG. 20, there is shown a top-down view of two example microlens arrays 102. Top-down view 2001 depicts a flat microlens array 102A. Top-down view 2002 depicts a tilted microlens array 102B. In top-down view 2002, each microlens 201 is tilted towards optical axis (x, y=0, 0). Referring now also to FIG. 21, there are shown example 3D plots of the top-down views depicted in FIG. 20. 3D plot 2101A corresponds to flat microlens array 102A. 3D plot 2101B corresponds to tilted microlens array 102B. In the color versions of FIGS. 20 and 21, red indicates high elevations, while blue indicates low elevations.

Figure 22:
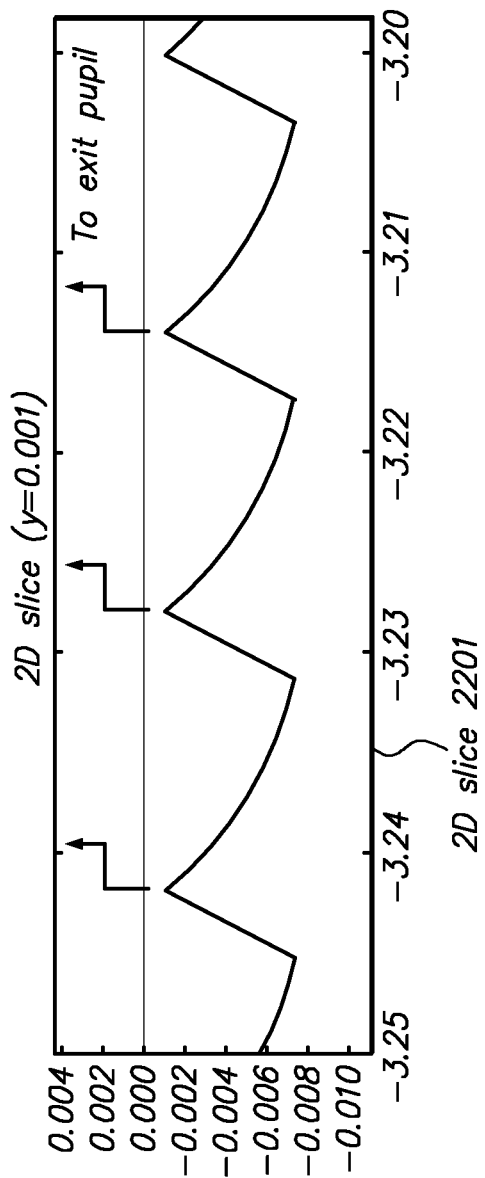
FIG. 22 depicts an example 2D slice through a microlens array of tilted microlenses.

Referring now to FIG. 22, there is shown an example 2D slice 2201 through a microlens array 102 containing tilted microlenses 201. 2D slice 2201 illustrates how each tilted microlens 201 is joined to its neighbors with planes. If the incident medium of the ray is air, the planes are oriented such that they are parallel to rays coming from the center of main lens's 113 exit pupil. If the incident medium of the ray is not air, and therefore has a refractive index greater than one, the planes are oriented such that they are parallel to the refracted angle of the rays coming from the center of the main lens. This is done to minimize the effect of these scattering surfaces, as seen by an observer at the center of the main lens's 113 exit pupil. Further optimization of the tilted MLA side wall angle can be performed, so as to account for the f-number and vignetting of the main lens and scattering, reflection, and total internal reflection from the lens surfaces.

Figure 23B:
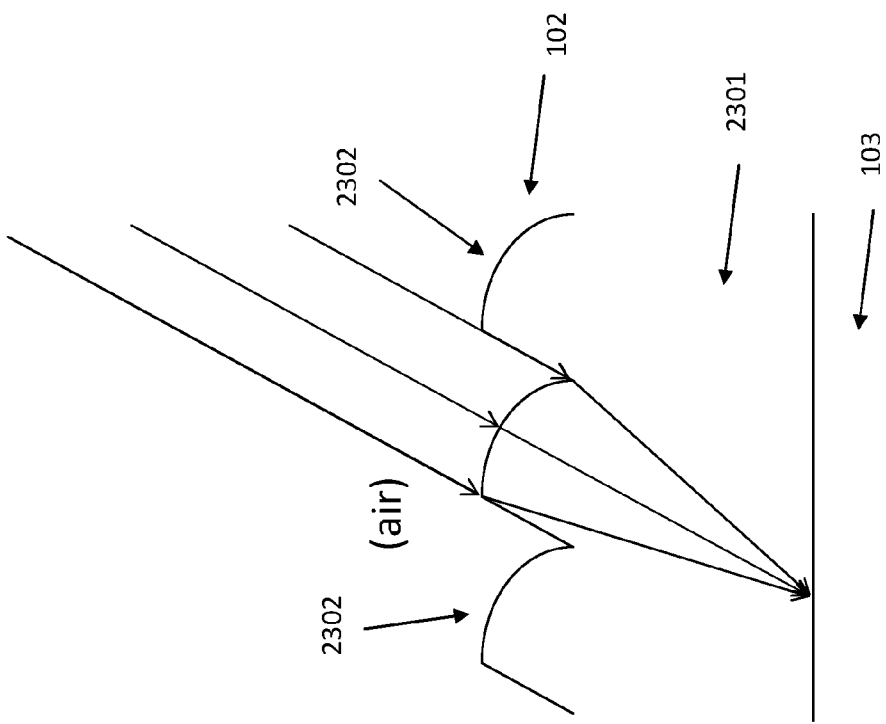
FIGS. 23A and 23B depict two examples of different types of optimization of the tilted MLA side wall angle.
Figure 23A:
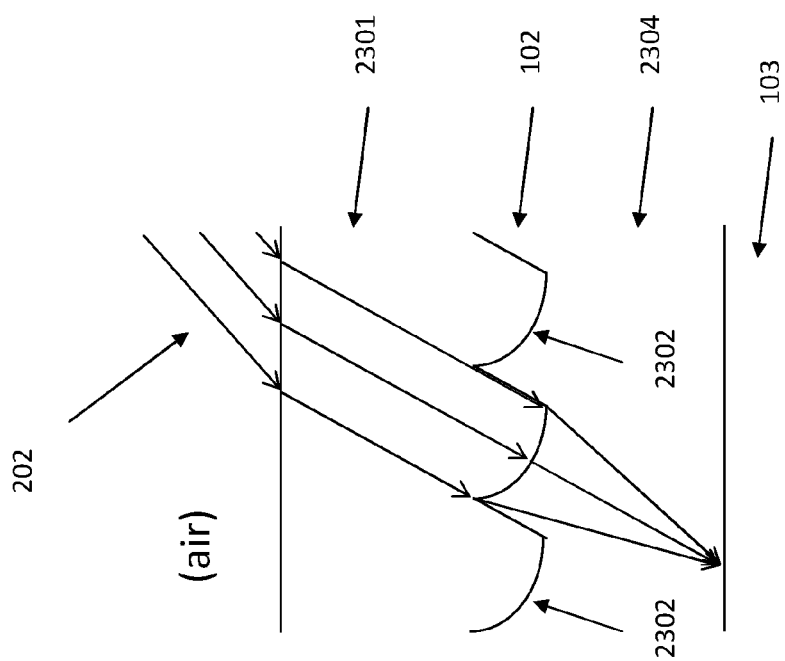

Referring now to FIGS. 23A and 23B, there are shown two examples of different types of optimization of the tilted MLA side wall angle. In FIG. 23A, MLA 102 is shaped from the bottom edge of incident medium 2301 (which may be, for example, glass, polymer, or other light-transmissive material), with an air gap 2304 between medium 2301 and sensor 103. Light rays 202 arriving from main lens 113 exit pupil refract when they hit medium 2301. Planes 2302 of MLA 102 are shaped and oriented so that they match the refracted angle of the incident light, and so that they properly focus light rays 202 onto sensor 103.

In FIG. 23B, MLA 102 is shaped from the top edge of incident medium 2301, with no air gap between medium 2301 and sensor 103. Here, light rays 202 arriving from main lens 113 exit pupil refract when they hit planes 2302 of MLA 102, which are shaped from the top edge of incident medium 2301. Accordingly, in this embodiment, planes 2302 are shaped and oriented so that they match the angle of the incident light in air, and so that they properly focus light rays 202 onto sensor 103.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in at least one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. In a light field image capture device, the light field image capture device including an aperture, a main lens, a microlens array, at least one sensor, and processing circuitry, the lenses on the microlens array arranged in a regular pattern, the pixels on the at least one sensor arranged in a regular pattern, the microlens array and at least one sensor interoperating to capture light field image data from light passing through the aperture and the main lens, a method for perturbing at least one regular pattern of the light field image capture device to increase the quality of captured light field image data, the method comprising:
    accessing light that has passed through the aperture and the main leans;
    at the processing circuitry, introducing random variations into at least one of: the regular pattern of lenses in the microlens array and the regular pattern of pixels in the at least one sensor;
    subsequent to introduction of the random variations, capturing light field image data from the accessed light; and
    sending the captured light field image data to the processing circuitry.

2. The method of claim 1, wherein introducing random variations into at least one of: the regular pattern of lenses and the regular pattern of pixels comprises introducing a jitter pattern into at least one of: the regular pattern of lenses and the regular pattern of pixels.

3. The method of claim 2, wherein introducing a jitter pattern into at least one of the regular pattern of lenses and the regular pattern of pixels comprises introducing a jitter pattern into the regular pattern of lenses that extends across the entire microlens array.

4. The method of claim 2, wherein introducing a jitter pattern into at least one of the regular pattern of lenses and the regular pattern of pixels comprises introducing a jitter pattern into the regular pattern of pixels that extends across the entirety of at least one sensor.

5. The method of claim 2, wherein introducing a jitter pattern into at least one of the regular pattern of lenses and the regular pattern of pixels comprises introducing a jitter pattern tile into the regular pattern of lenses, the jitter pattern tile being repeated a plurality of times across the entire microlens array.

6. The method of claim 2, wherein introducing a jitter pattern into at least one of the regular pattern of lenses and the regular pattern of pixels comprises introducing a jitter pattern tile into the regular pattern of pixels, the jitter pattern tile being repeated a plurality of times across the entire at least one sensor.

7. A non-transitory computer program product for use in a light field image capture device, the light field image capture device including an aperture, a main lens, a microlens array, at least one sensor, and processing circuitry, the lenses on the microlens array arranged in a regular pattern, the pixels on the at least one sensor arranged in a regular pattern, the microlens array and at least one sensor interoperating to capture light field image data from light passing through the aperture and the main lens, the non-transitory computer program product comprising instructions stored thereon, that when executed on the processing circuitry of the light field image capture device, perform the steps of:

accessing light that has passed through the aperture and the main leans;

introducing random variations into at least one of: the regular pattern of lenses in the microlens array and the regular pattern of pixels in the at least one sensor;

subsequent to introduction of the random variations, causing the sensor to capture light field image data from the accessed light; and receiving the captured light field image data at the processing circuitry.

8. A light field image capture device, comprising:

an aperture;

a main lens;

a microlens array having lenses arranged in a regular pattern;

at least one sensor having pixels arranged in a regular pattern, the at least one sensor configured to capture light field image data representing output of the microlens array, the microlens array and the at least one sensor interoperating to capture light field image data from light passing through the aperture and the main lens:

a pre-processor, configured to access light that has passed through the aperture and the main leans and to introduce random variations into at least one of: the regular pattern of lenses in the microlens array and the regular pattern of pixels in the at least one sensor;

processing circuitry, configured to, subsequent to introduction of the random variations, capture light field image data from the accessed light and process the pre-processed light field image data to generate visual output.

* * * * *

UNITED STATES PATENT AND TRADEMARK OFFICE
CERTIFICATE OF CORRECTION

PATENT NO. : 9,866,810 B2
APPLICATION NO. : 15/050183
DATED : January 9, 2018
INVENTOR(S) : Timothy Knight et al.

Page 1 of 1

It is certified that error appears in the above-identified patent and that said Letters Patent is hereby corrected as shown below:

In the Claims

• Column 24, Line 55: please replace "leans" with –lens–

• Column 26, Line 4: please replace "leans" with –lens–

• Column 26, Line 25: please replace "leans" with –lens–

Signed and Sealed this
Fifth Day of June, 2018

Andrei Iancu
*Director of the United States Patent and Trademark Office*